(12) United States Patent
Bergeron et al.

(10) Patent No.: US 7,975,735 B2
(45) Date of Patent: Jul. 12, 2011

(54) TREE PROCESSING VEHICLE

(75) Inventors: Stephane Bergeron, Granby (CA);
Martin Roy, Canton Magog (CA);
Pierre Chagnon, Lac Brome (CA);
Jonathan Thibault, Mont-St-Hilaire (CA)

(73) Assignee: Camoplast Industrial, Inc. (CA)

( * ) Notice: Subject to any disclaimer, the term of this patent is extended or adjusted under 35 U.S.C. 154(b) by 51 days.

(21) Appl. No.: 12/237,987

(22) Filed: Sep. 25, 2008

(65) Prior Publication Data
US 2010/0071809 A1    Mar. 25, 2010

(51) Int. Cl.
*A01G 23/08* (2006.01)
*B23Q 23/00* (2006.01)

(52) U.S. Cl. ........ 144/335; 144/4.1; 144/34.1; 144/336; 144/356; 144/404; 144/427

(58) Field of Classification Search ............... 144/4.1, 144/34.1, 34.5, 24.12; 180/24; 56/10.2 R
See application file for complete search history.

(56) References Cited

U.S. PATENT DOCUMENTS

| | | | | |
|---|---|---|---|---|
| 4,236,554 | A | * | 12/1980 | Nicholson .................... 144/34.1 |
| 4,338,985 | A | * | 7/1982 | Smith et al. .................. 144/34.1 |
| 4,432,427 | A | * | 2/1984 | van der Lely .................. 180/24 |
| 5,408,814 | A | * | 4/1995 | Milbourn ...................... 56/15.2 |
| 6,085,811 | A | * | 7/2000 | Wiemeri et al. ............... 144/4.1 |
| 6,698,478 | B2 | * | 3/2004 | Nault ............................ 144/336 |
| 2008/0072997 | A1 | * | 3/2008 | Thompson .................... 144/4.1 |

OTHER PUBLICATIONS

Geo-Boy, www.geo-boy.com, Mar. 2006.
Versatrac Industries, www.versatracind.com/default.asp?no=1, Fall 2006.
KMC-KOOTRAC, www.kmc-kootrac.com/industry/mulch_brush.html, Jun. 2006.
RWF Bron, www.bronrwf.com/mulcher/features.php, Jun. 2006.
Supertrak, www.supertrak.com, Jun. 2006.

* cited by examiner

*Primary Examiner* — Shelley Self
(74) *Attorney, Agent, or Firm* — Seyfarth Shaw LLP

(57) ABSTRACT

A tree processing vehicle comprising a prime mover and a pair of tracks for propelling the tree processing vehicle, the prime mover being in a driving relationship with the tracks. The tree processing vehicle also comprises an operator cabin comprising a front side, a rear side, and a pair of lateral sides between the front side and the rear side. A first one of the lateral sides defines an access opening allowing an operator to enter or exit the operator cabin. The operator cabin also comprises a door for closing the access opening and a set of controls for allowing the operator to control the tree processing vehicle. The tree processing vehicle also comprises a pair of arms pivotally movable across a range of angular positions. The range of angular positions includes a first angular position in which a first one of the arms extends across at least part of the access opening and a second angular position in which the first one of the arms clears the access opening thereby allowing the door to be opened or closed.

46 Claims, 20 Drawing Sheets

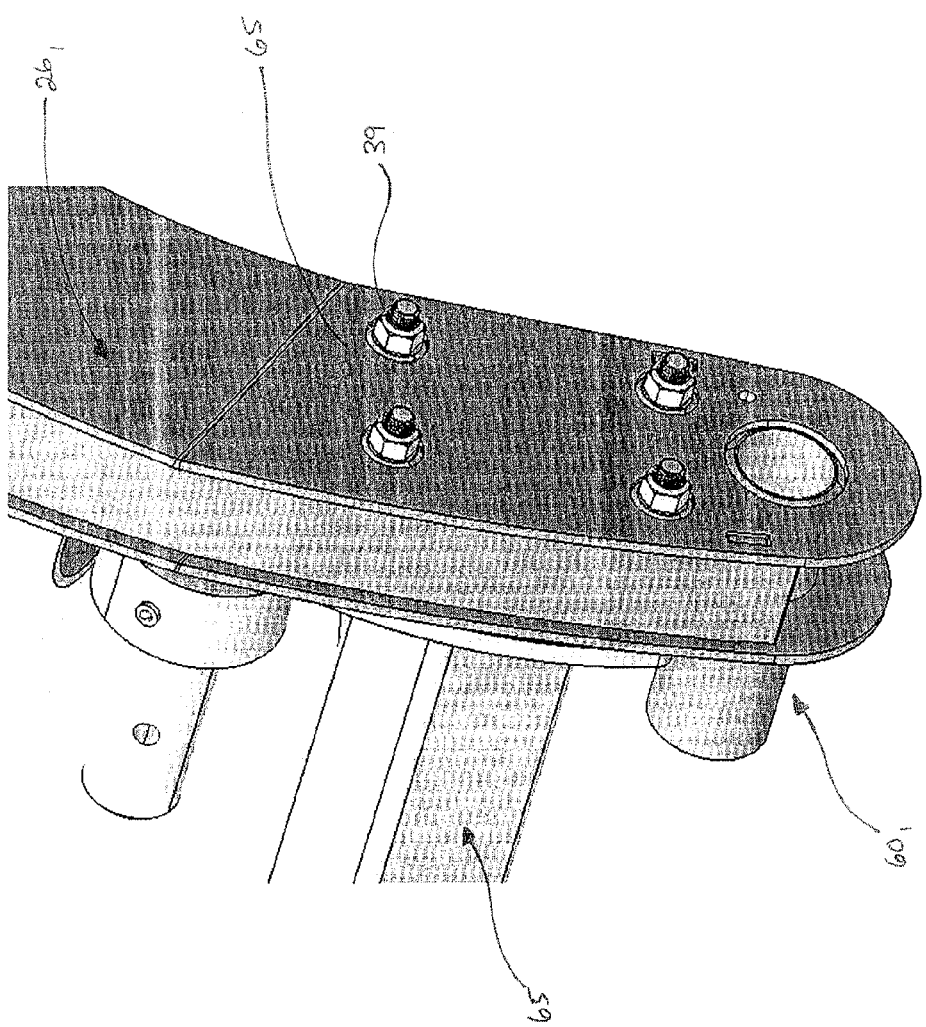

TREE PROCESSING VEHICLE

FIELD OF THE INVENTION

The invention relates generally to tree processing and, more particularly, to a tree processing vehicle for use in various tree processing applications.

BACKGROUND

Tree processing vehicles are used in various applications involving processing of trees, such as land clearing (e.g., for property development), right-of-way clearing, creation and maintenance of parks and trails, orchard pruning, forest fire management, etc. These vehicles typically have a tree processing implement for processing (e.g., cutting, shredding, grappling) tree materials, which can range from standing large trees to small trees (e.g., those making up brushwood, tree stumps and roots, etc.).

One type of tree processing vehicle, sometimes referred to as a "mulcher", is propelled by a pair of tracks and comprises a tree processing implement mounted to a pair of arms pivotally movable to controllably raise and lower the tree processing implement in order to process trees at various processing heights, in particular to shred portions of trees through downward shredding strokes of the tree processing element. An operator cabin includes controls allowing an operator to control the tree processing vehicle, both to drive the tree processing vehicle and to operate the tree processing element.

The operator cabin is often associated with a number of problems. For example, the operator cabin has a front side defining an access opening through which the operator can enter or exit the cabin upon opening a door serving to close the access opening. The access opening is located on the front side of the operator cabin primarily because of the arms which pass along lateral sides of the operator cabin as they are pivoted. However, as the tree processing implement is located in front of the tree processing vehicle, this location of the access opening on the front side of the operator cabin can make it inconvenient, difficult and/or hazardous for the operator to enter or exit the cabin. In addition, the operator cabin is typically located on the tree processing vehicle in such a way that it can make it difficult and/or impossible for an operator, mechanic or technician to access certain mechanical components of the vehicle for maintenance and/or repair operations, without disassembling and removing part or all of the operator cabin from the vehicle.

Accordingly, there is a need for improvements in tree processing vehicles, in particular for operator cabins of such vehicles.

SUMMARY OF THE INVENTION

According to a first broad aspect, the invention provides a tree processing vehicle. The tree processing vehicle comprises a prime mover and a pair of tracks for propelling the tree processing vehicle, the prime mover being in a driving relationship with the tracks. The tree processing vehicle also comprises an operator cabin comprising a front side, a rear side, and a pair of lateral sides between the front side and the rear side. A first one of the lateral sides defines an access opening allowing an operator to enter or exit the operator cabin. The operator cabin also comprises a door for closing the access opening and a set of controls for allowing the operator to control the tree processing vehicle. The tree processing vehicle also comprises a pair of arms pivotally movable across a range of angular positions. The range of angular positions includes a first angular position in which a first one of the arms extends across at least part of the access opening and a second angular position in which the first one of the arms clears the access opening thereby allowing the door to be opened or closed. The tree processing vehicle further comprises a tree processing implement mounted to the arms such that, when the arms pivot across the range of angular positions, the tree processing implement moves across a range of processing heights. The arms are pivotally movable in the range of angular positions to move the tree processing implement in the range of processing heights such as to impart to the tree processing implement a downward tree shredding stroke during which the tree processing implement shreds at least a portion of a tree.

According to a second broad aspect, the invention provides a tree processing vehicle. The tree processing vehicle comprises a prime mover and a pair of tracks for propelling the tree processing vehicle, the prime mover being in a driving relationship with the tracks. The tree processing vehicle also comprises an operator cabin comprising a front side, a rear side, and a pair of lateral sides between the front side and the rear side. A first one of the lateral sides defines an access opening allowing an operator to enter or exit the operator cabin. The operator cabin also comprises a door for closing the access opening and a set of controls for allowing the operator to control the tree processing vehicle. The tree processing vehicle also comprises a pair of arms pivotally movable across a range of angular positions. The range of angular positions includes a first angular position in which a first one of the arms extends across at least part of the access opening and a second angular position in which the first one of the arms clears the access opening thereby allowing the door to be opened or closed. Each of the arms comprises a mounting portion to which a tree processing implement is mountable such that, when the arms pivot across the range of angular positions, the tree processing implement moves across a range of processing heights at which the tree processing implement can perform a tree processing function.

According to a third broad aspect, the invention provides a method for processing trees. The method comprises approaching a tree processing vehicle comprising a prime mover and a pair of tracks for propelling the tree processing vehicle, the prime mover being in a driving relationship with the tracks. The tree processing vehicle also comprises an operator cabin comprising a front side, a rear side, and a pair of lateral sides between the front side and the rear side. A first one of the lateral sides defines an access opening allowing an operator to enter or exit the operator cabin. The operator cabin also comprises a door for closing the access opening and a set of controls for allowing the operator to control the tree processing vehicle. The tree processing vehicle also comprises a pair of arms pivotally movable across a range of angular positions. The range of angular positions includes a first angular position in which a first one of the arms extends across at least part of the access opening and a second angular position in which the first one of the arms clears the access opening thereby allowing the door to be opened or closed. The tree processing vehicle further comprises a tree processing implement mounted to the arms such that, when the arms pivot across the range of angular positions, the tree processing implement moves across a range of processing heights. The method further comprises: opening the door while the arms are in the second angular position; entering the operator cabin; closing the door; using the set of controls to move the tree processing vehicle and cause the arms to pivotally move in the range of angular positions to move the tree processing implement in the range of processing heights such as to impart to the tree processing implement a downward tree shredding stroke during which the tree processing implement shreds at least a portion of a tree; opening the door while the arms are in the second angular position; and exiting the operator cabin.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 19 and 20 show part of an arm interconnector interconnecting a pair of arms of the tree processing vehicle of FIG. 1.

Figure 1:
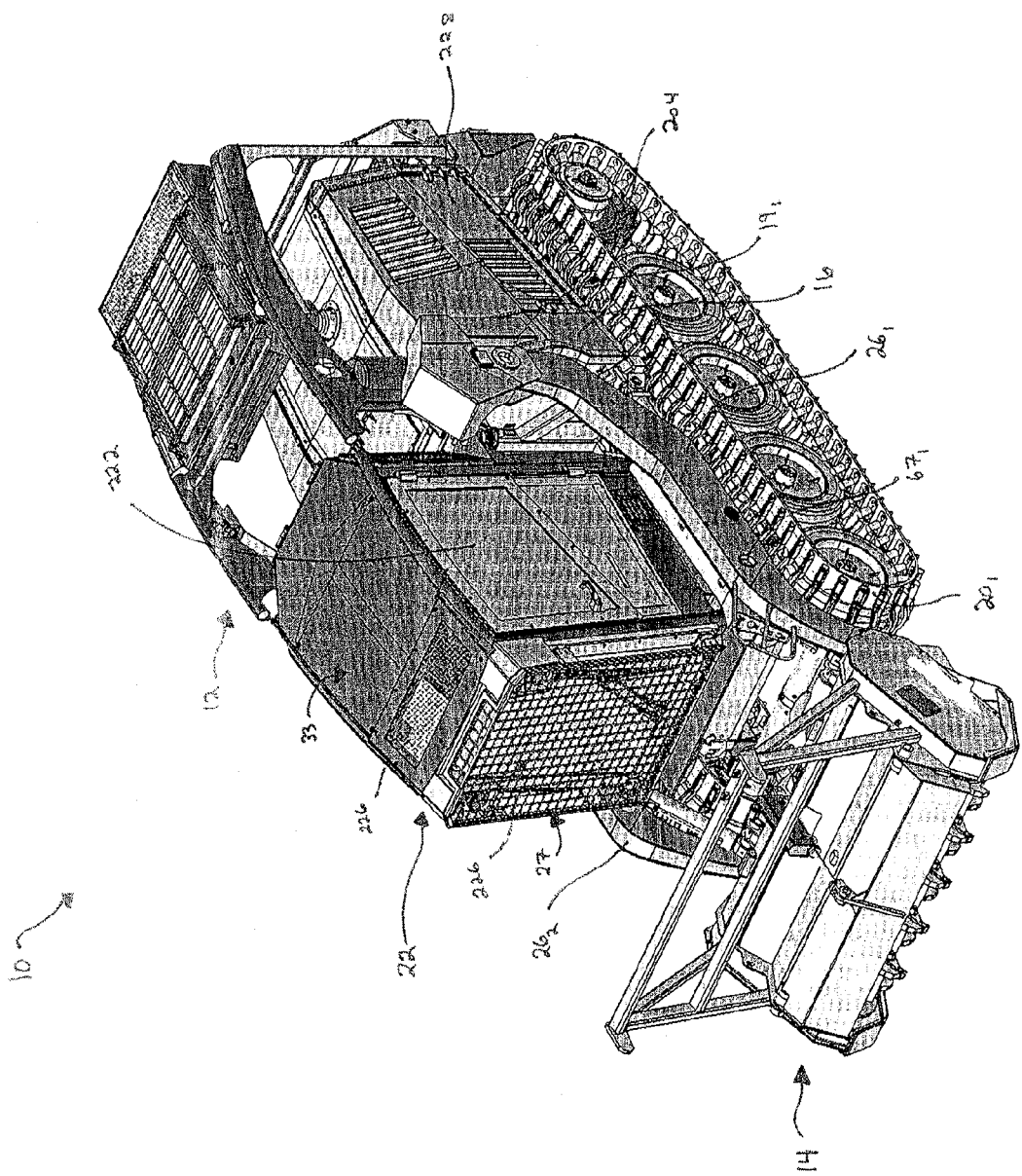
FIG. 1 shows a perspective view of a tree processing vehicle in accordance with an embodiment of the invention.
Figure 2:
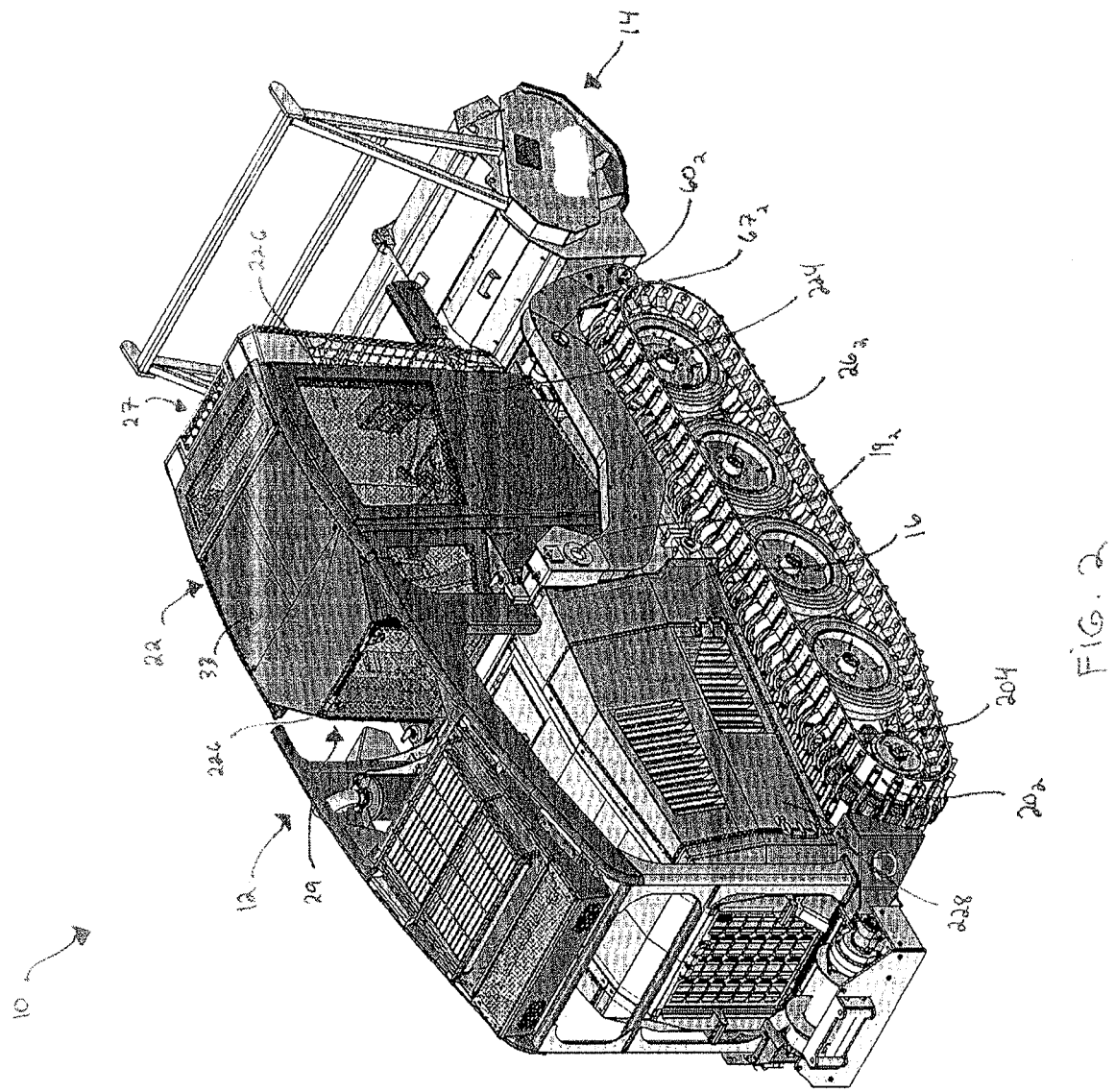
FIG. 2 shows another perspective view of the tree processing vehicle of FIG. 1.
Figure 3:
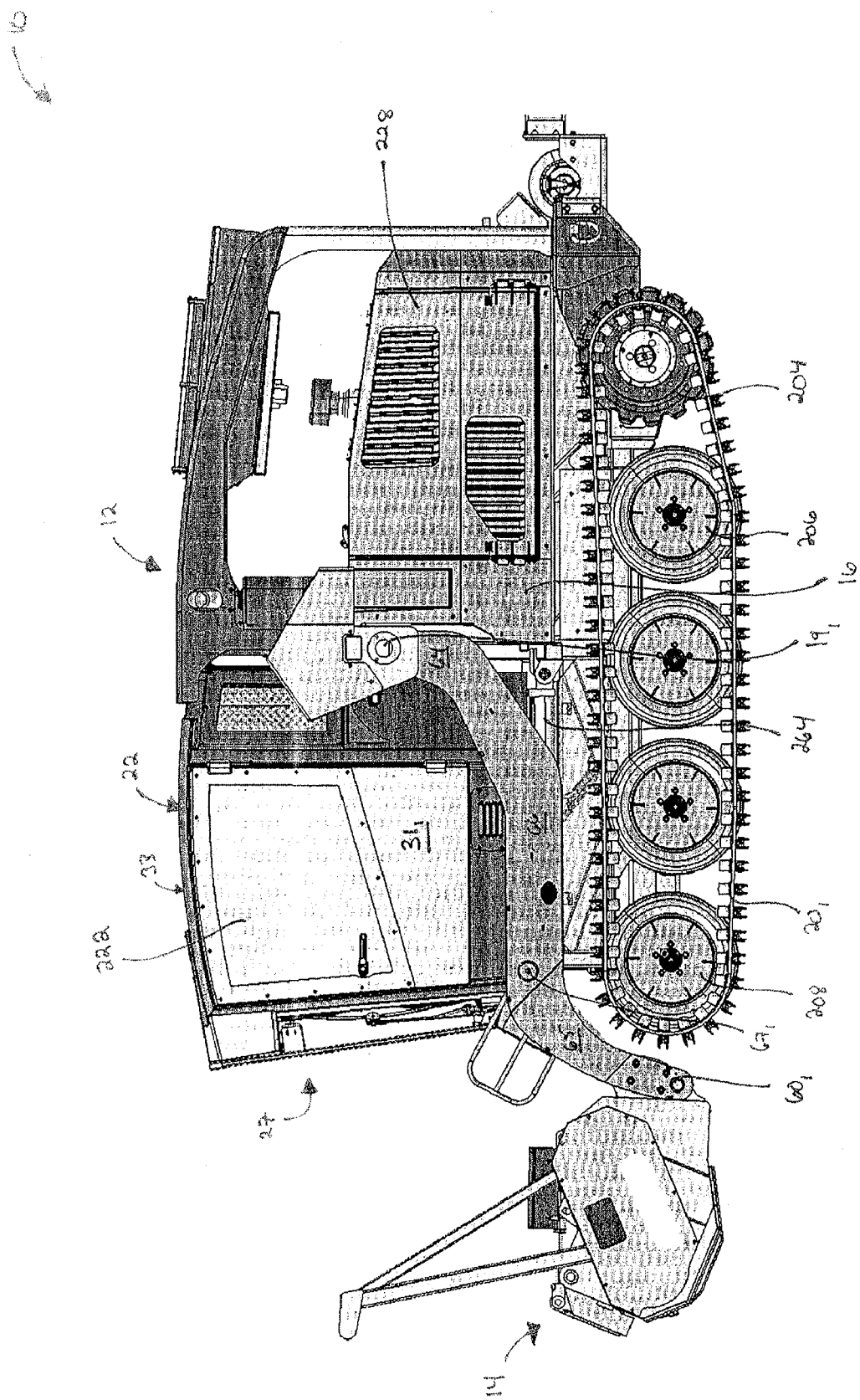
FIG. 3 shows a left side view of the tree processing vehicle of FIG. 1.
Figure 4:
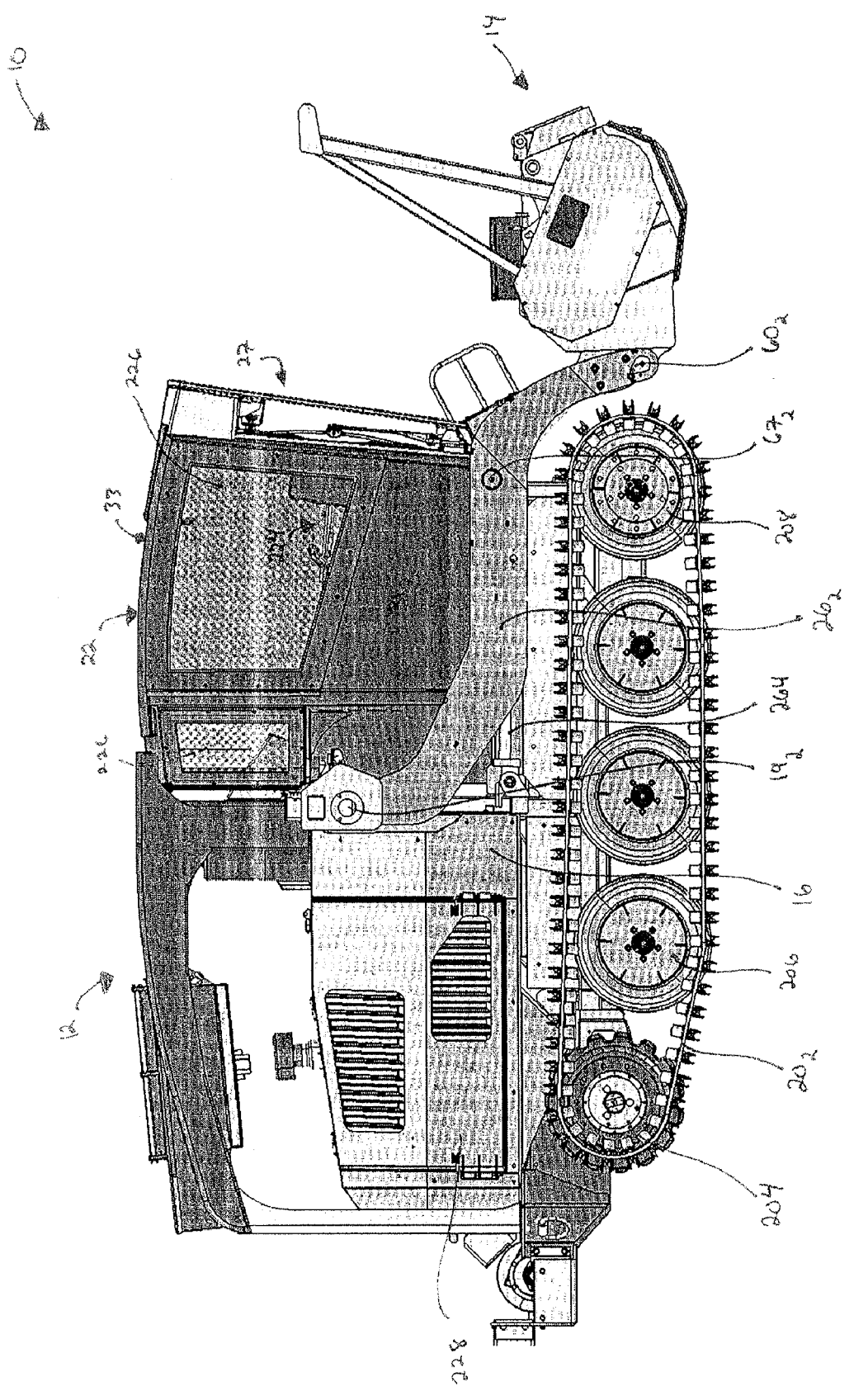
FIG. 4 shows a right side view of the tree processing vehicle of FIG. 1.
Figure 5:
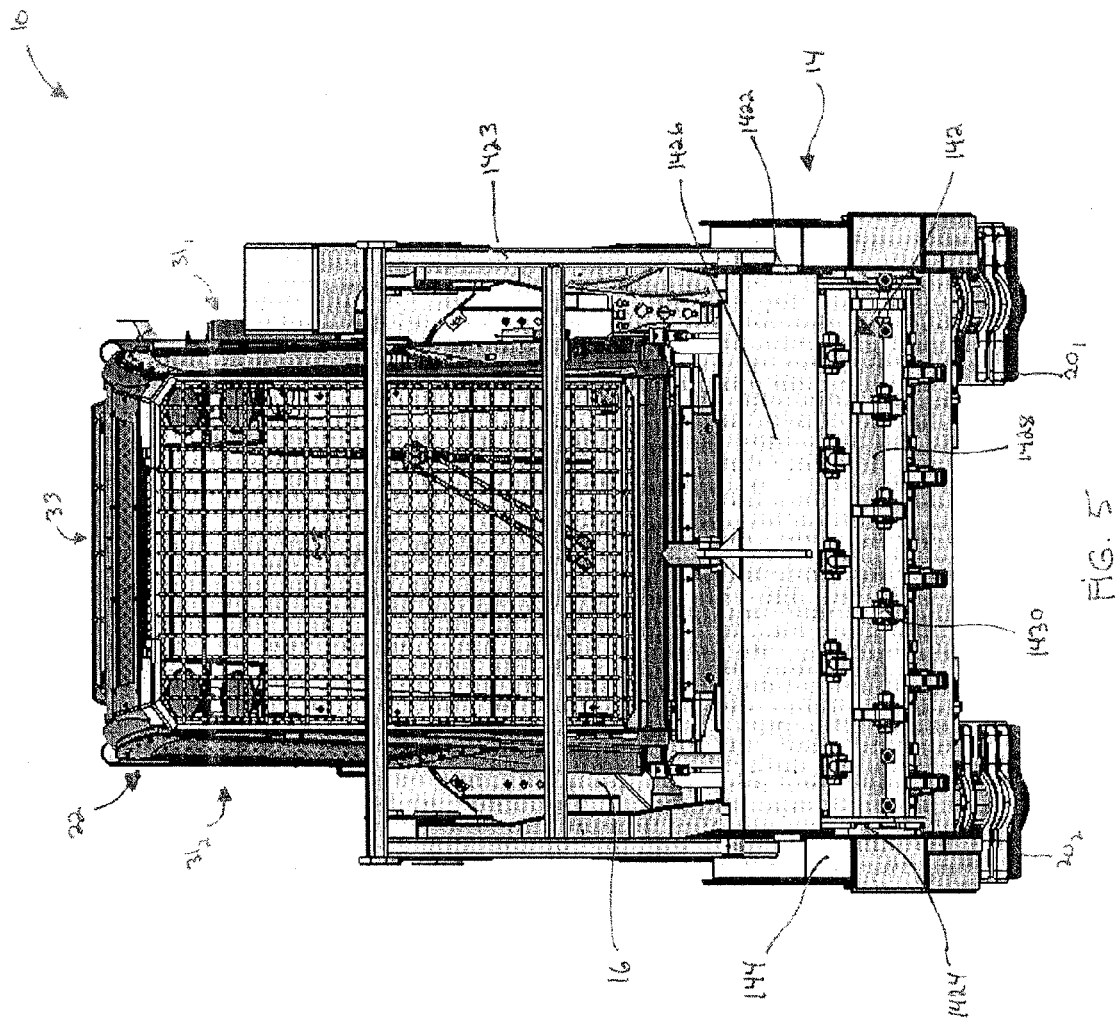
FIG. 5 shows a front view of the tree processing vehicle of FIG. 1.
Figure 6:
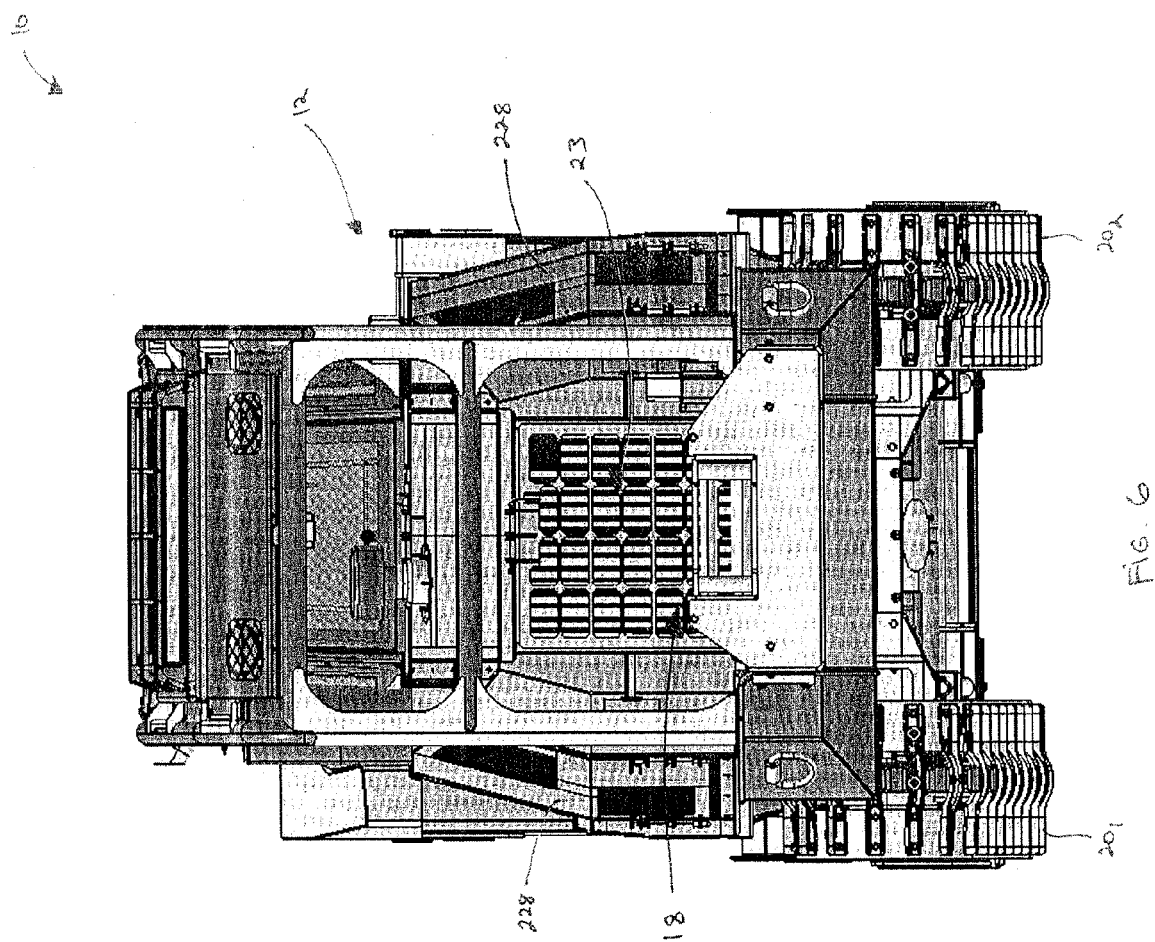
FIG. 6 shows a rear view of the tree processing vehicle of FIG. 1.
Figure 7:
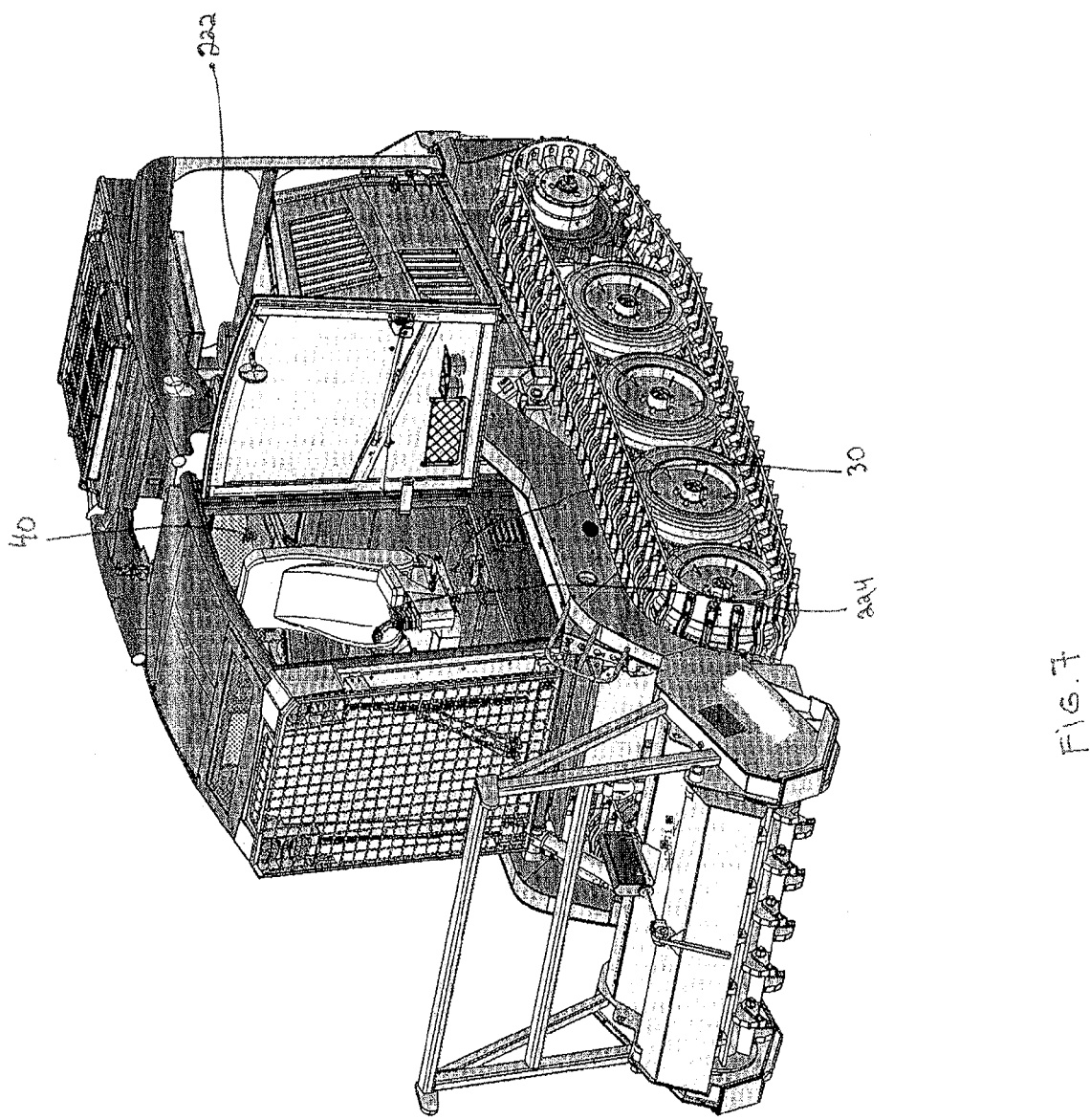
FIG. 7 shows the tree processing vehicle of FIG. 1 with a door of an operator cabin in an open position.
Figure 8:
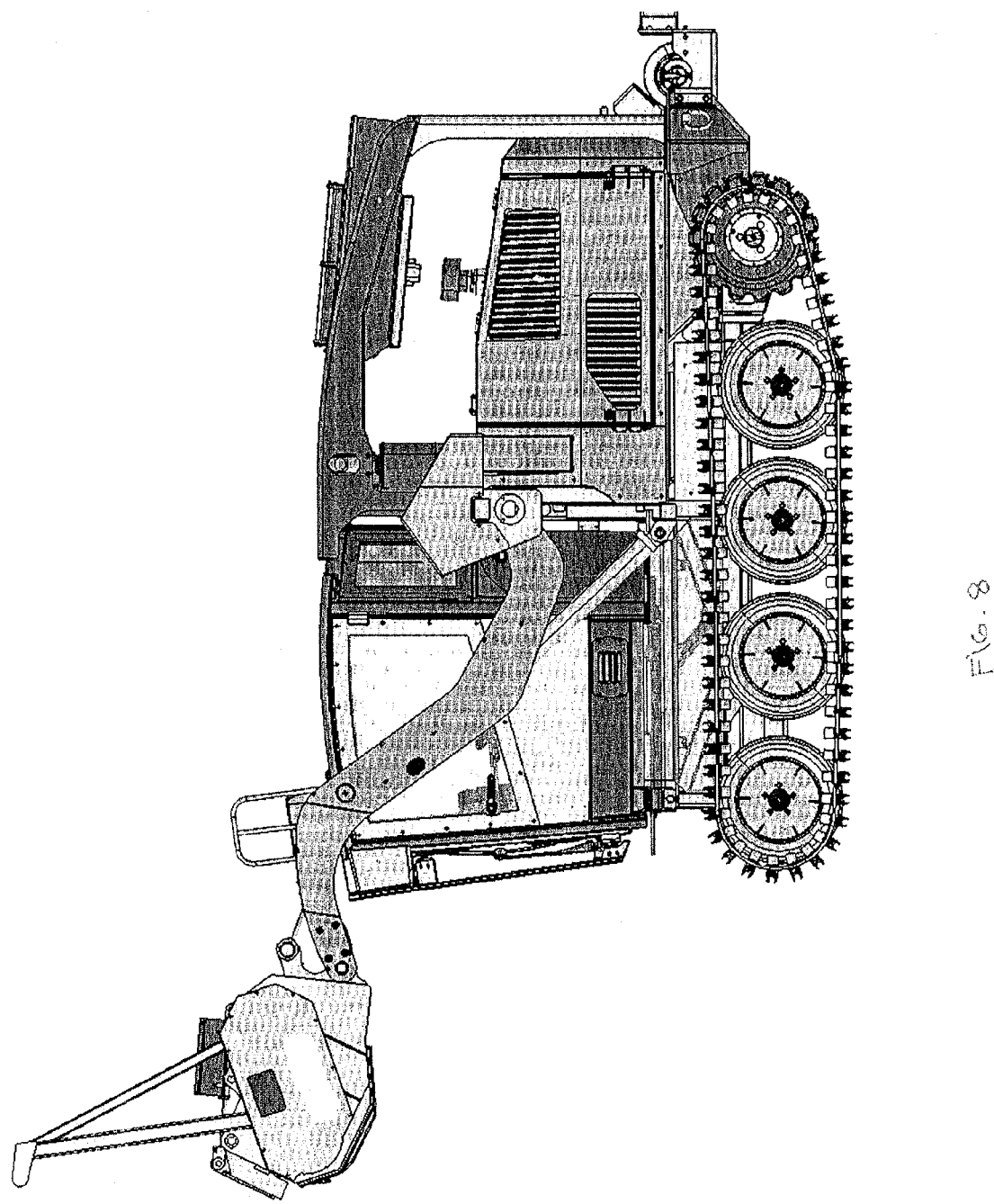
FIGS. 8 to 10 show left side, right side and front views of the tree processing vehicle of FIG. 1, with a tree processing element at another processing height.
Figure 9:
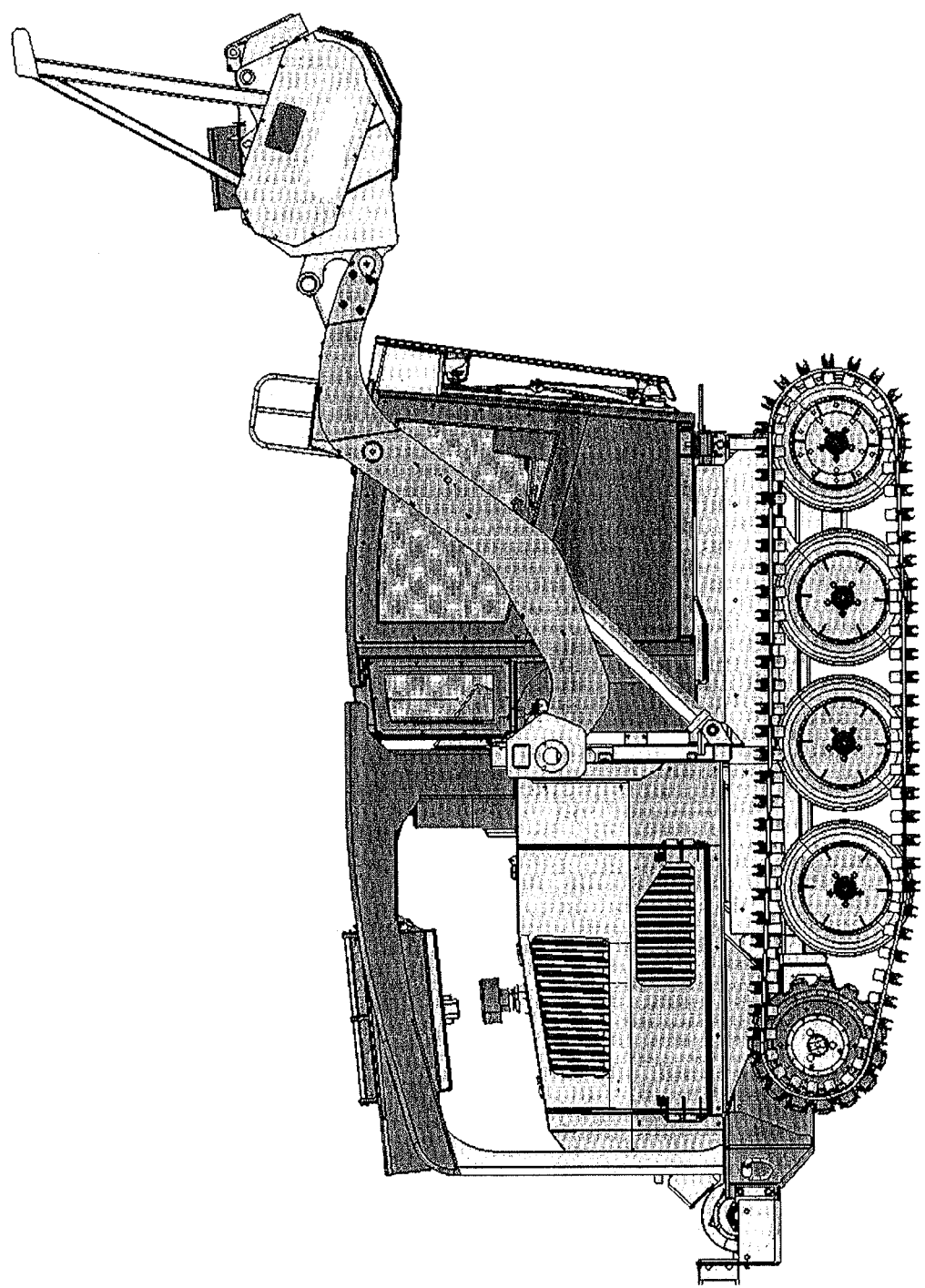
Figure 10:
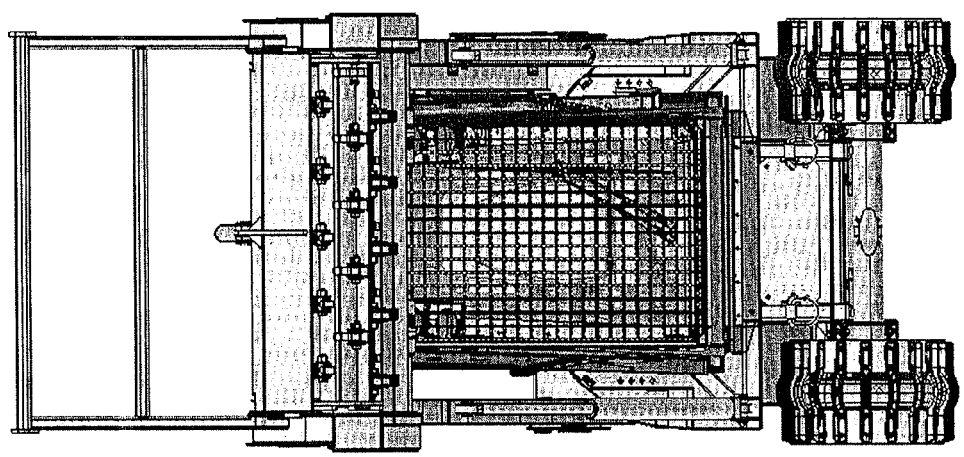
Figure 11:
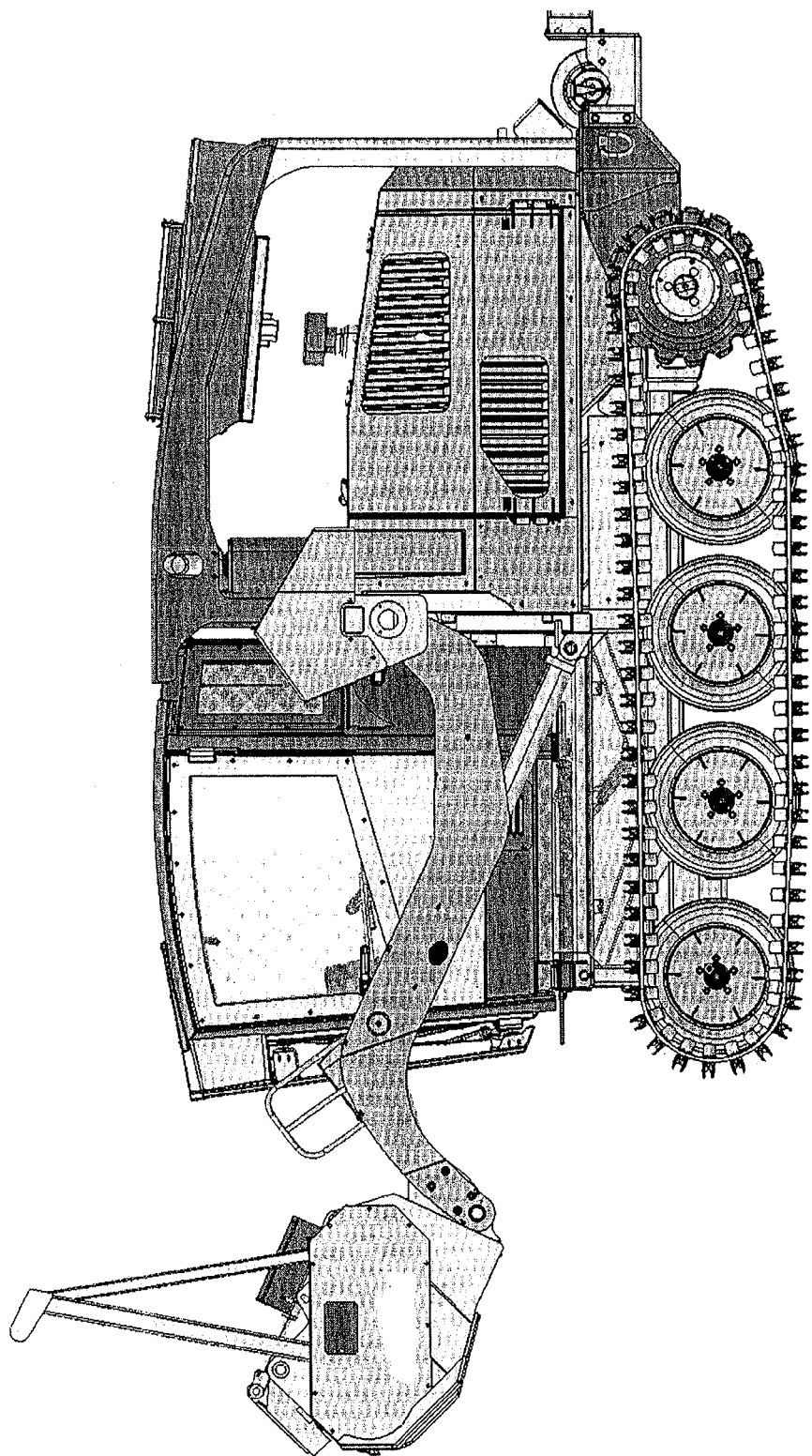
FIGS. 11 to 13 show left side, right side and front views of the tree processing vehicle of FIG. 1, with the tree processing element at yet another processing height.
Figure 12:
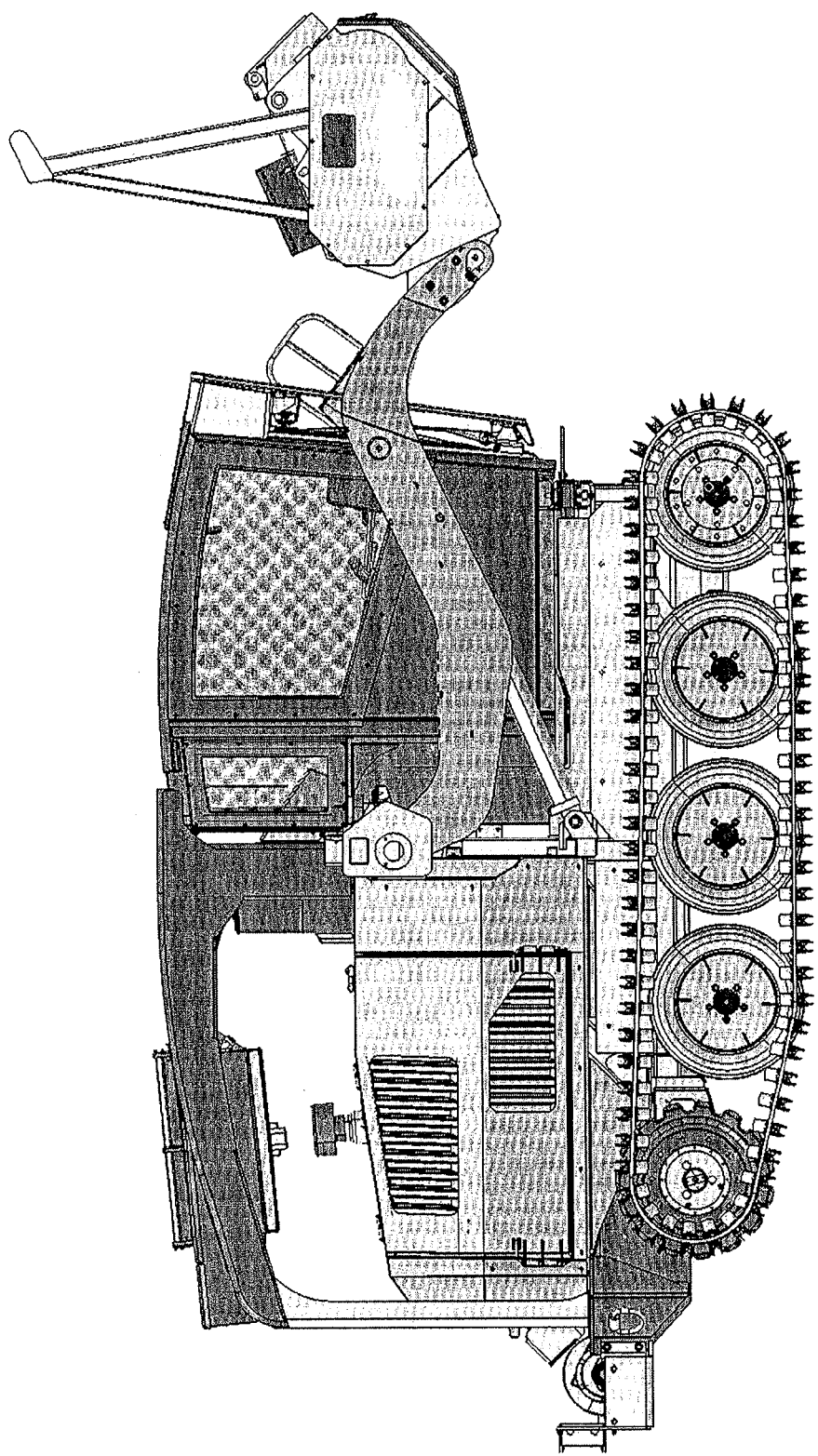

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

FIGS. 1 to 13 show a tree processing vehicle 10 in accordance with an embodiment of the invention. The tree processing vehicle 10 comprises a self-propelled carrier 12 and a tree processing implement 14 mounted to the self-propelled carrier 12 and can be used in various applications involving processing of trees, such as land clearing (e.g., for property development), right-of-way clearing, creation and maintenance of parks and trails, orchard pruning, forest fire management, etc.

The self-propelled carrier 12 comprises a frame 16, a prime mover 18, a pair of tracks $20_1$, $20_2$, an operator cabin 22, and a pair of arms $26_1$, $26_2$ to which is mounted the tree processing implement 14. The arms $26_1$, $26_2$ are pivotally movable to raise or lower the tree processing implement 14 to various processing heights at which it can process portions of trees, which can include standing large trees, small trees (e.g., those making up brushwood, tree stumps and roots, etc.), and/or fallen or cut trees. In this embodiment, the tree processing implement 14 is configured to shred portions of trees that it encounters. In particular, as further discussed below, an operator in the operator cabin 22 can move the tree processing vehicle 10 and cause the arms $26_1$, $26_2$ to pivot to move the tree processing implement 14 between different processing heights such as to impart to the tree processing implement 14 a downward tree shredding stroke during which the tree processing implement 14 shreds at least a portion of a tree.

The frame 16 supports various components of the self-propelled carrier 12, including the prime mover 18, the operator cabin 22 and the arms $26_1$, $26_2$. In this embodiment, the frame 16 comprises a front portion, a rear portion divided between an upper-rear portion and a lower-rear portion, a bottom portion, and a top portion, which provide dedicated areas for components of the self-propelled carrier 12, including the prime mover 18, the tracks $20_1$, $20_2$, and the operator cabin 22. The frame 16 also comprises pivot points $19_1$, $19_2$ at which the arms $26_1$, $26_2$ are mounted so that they can pivotally move across a range of angular positions.

More particularly, in this embodiment, the prime mover 18 is located in the lower-rear portion of the frame 16. The upper-rear portion of the frame 16 supports an engine protection device (e.g., a cowling) to protect the prime mover 18 as well as one or more ventilation components (e.g., radiators and/or cooling fans) for ventilation associated with operation of the prime mover 18.

The operator cabin 22 is located in the front portion of the frame 16, with its height extending across both the lower- and upper-rear portions of the frame 16. This can allow the operator to estimate a relative height of the tree processing vehicle 10 to any objects/obstructions based on their view from the operator cabin 22, which can help the operator navigate the vehicle 10 safely within a terrain that may be densely wooded and that may have other workers and/or vehicles working in close proximity.

The bottom portion of the frame 16 is located below its front and lower-rear portions and provides an area for the tracks $20_1$, $20_2$, with the track $20_1$ running along a left side of the frame 16 and the track $20_2$ running along a right side of the frame 16.

The arms $26_1$, $26_2$ extend forwardly along the left and right sides of the front portion of the frame 16, with each arm extending from one of the pivot points $19_1$, $19_2$ that are located in a central area between the rear portion and the front portion of the frame 16. With the pivot points $19_1$, $19_2$ for the arms $26_1$, $26_2$ located in the central area of the frame 16, the weight of the prime mover 18, the operator cabin 22 and the tracks $20_1$, $20_2$ may be used to counteract the weight of the arms $26_1$, $26_2$, as well as the tree processing implement 14 that is being supported while the arms $26_1$, $26_2$ are in any angular position, in order to keep the tree processing vehicle 10 balanced and upright.

The frame 16 may be made of any suitable material(s) (e.g., aluminum, cast iron or steel) and may be cast as a single unit or assembled from different sub-frame members. For example, different portions of the frame 16 may be constructed from different sub-frame members, which may be made from different materials.

The prime mover 18 provides motive power to move the tree processing vehicle 10. In this embodiment, the prime mover 18 comprises an internal combustion engine capable of developing sufficient motive power for the vehicle 10 (e.g., a 142 horsepower Caterpillar® C4.4 water-cooled 4-cylinder engine). The internal combustion engine is associated with a fuel tank to provide fuel (such as gasoline) for generating motive power, and potentially with other components for its operation (e.g., an air cleaner to clean air supplied to it). In other embodiments, the prime mover 18 may comprise other types of motors (e.g., other types of internal combustion engines, electric motors, etc.) for generating motive power to move the processing vehicle 10.

In this embodiment, the self-propelled carrier 12 also comprises a hydraulic system 23 comprising at least one hydraulic reservoir and hydraulic pump to supply hydraulic fluid that is pressurized to hydraulic actuators (e.g., an hydraulic motor or hydraulic cylinder) of the tree processing vehicle 10 that can convert flow of this hydraulic fluid into force, torque and/or motion. The hydraulic system 23 may be driven by the prime mover 18 and/or a separate motor (e.g., a separate internal combustion engine or electric motor).

The tracks $20_1$, $20_2$ provide traction to propel the tree processing vehicle 10 in a given direction. The prime mover 18 is in a driving relationship with the tracks $20_1$, $20_2$ via suitable drive components such that, when driven by the prime mover 18, each track moves along an endless path for propelling the tree processing vehicle 12 on the ground.

More particularly, in this embodiment, each track $20_1$, $20_2$ is part of a respective track assembly that also comprises a drive wheel 204, a plurality of guide wheels 206 and an idler wheel 208.

Each track $20_1$, $20_2$ may be made of various solid materials, such as steel and/or rubber, and may have various configurations. Generally, each track $20_1$, $20_2$ has an outer side for engaging the ground and an inner side for engaging other components of its associated track assembly. In this embodiment, each track $20_1$, $20_2$ comprises a pair of belts that are connected by a plurality of cross-links (e.g., steel cross-links) to form a tread at each cross-link. Each tread has an outer portion to engage the ground, and an inner portion to engage the drive wheel 204, the guide wheels 206 and the idler wheel 208. The outer portion of each tread may include one or more profiles or grooves, such as chevrons.

The drive wheel 204 of each track assembly is configured to drive the track $20_1$, $20_2$ of that track assembly. In this embodiment, the drive wheel 204 comprises a sprocket with spaced teeth that engage openings between the cross-links of the track $20_1$, $20_2$. The inner portion of each tread of the track $20_1$, $20_2$ comprises spaced perforations or indentations that match the teeth of the drive wheel 204. As a result, when the drive wheel 204 is driven by the prime mover 18, engagement between a given tooth in the wheel 204 and its associated cross-links cause the track $20_1$, $20_2$ to move in the same general direction.

The guide wheels 206 and the idler wheel 208 of each track assembly are used to define a shape for the track $20_1$, $20_2$ of that track assembly and provide tension so the track $20_1$, $20_2$ may maintain this shape. In this embodiment, the guide wheels 206 and the idler wheel 208 are circular wheels with a central perforation to allow attachment to the frame 16. To allow for movement of these wheels, a center part of each cross-link in the track $20_1$, $20_2$ is flat and the width of the cross-links is sufficient to allow unimpeded rotation of the guide wheels 206 and the idler wheel 208. This ensures that enough tension is maintained along the track $20_1$, $20_2$ to allow for efficient motion while still allowing sufficient slack to overcome obstacles and obstructions that may obstruct the path of the tree processing vehicle 10.

The tracks $20_1$, $20_2$ are laterally spaced by a distance that can be suitable to provide an overall gauge for the tree processing vehicle 10 allowing it to maintain a low ground pressure with an acceptable ground clearance, which can be advantageous in certain environments, such as in swamps/wetlands, irrigated farm land and/or in parks.

The operator cabin 22 is where the operator sits and controls the tree processing vehicle 10. The operator cabin 22 comprises a front side 27, a rear side 29, a pair of lateral sides $31_1$, $31_2$ between the front side 27 and the rear side 29, a top side 33 and a bottom side 35.

The lateral side $31_1$ of the operator cabin 22 defines an access opening 40 that allows the operator to enter or exit the operator cabin 22. This facilitates such entry and exit and makes them less hazardous than conventional tree processing vehicles where operator cabins are entered and exited via their front side. The operator cabin 22 comprises a door 222 for closing the access opening 40. In this case, the door 222 is hinged on the lateral side $31_1$ and has a handle to allow it to be opened or closed. While in this embodiment, the access opening 40 is defined by the lateral side $31_1$ of the operator cabin 22, in other embodiments, a similar access opening may be defined the lateral side $31_2$ of the operator cabin 22.

A plurality of windows 226 are provided to allow the operator to see outside of the tree processing vehicle 10. In this case, the windows 226 are provided on the front side 27, the lateral sides $31_1$, $31_2$ (including on the door 222), the top side 33 and the rear side 29.

The operator cabin 22 comprises a user interface comprising a set of controls 224 that allow the operator to control the tree processing vehicle 10. The set of controls 224 is connected to a control unit 30 configured to send signals to various components of the tree processing vehicle 10 to control their operation based on inputs made by the operator via the set of controls 224. The control unit 30 is also configured to control operation of components of the tree processing vehicle 10 based on signals it receives from sensors and other devices within the tree processing vehicle 10.

The set of controls 224 may comprise one or more input devices to allow the operator to input commands for execution by the tree processing vehicle 10. These one or more input devices may comprise a set of buttons, a joystick, a trackball, a switch, etc. By interacting with these one or more input devices, the operator can indicate to the control unit 30 what actions he/she wants to take with the tree processing vehicle 10, such as:

Start or stop the vehicle 10;

Initiate movement of the track 20 and/or the track $20_2$ to move the vehicle 10 in a particular direction or change direction;

Change an angular position of the arms $26_1$, $26_2$ to raise or lower the tree processing implement 14;

Adjust an angular position of the tree processing implement 14; and

Start or stop operation and/or change operational parameters of the tree processing implement 14.

The set of controls 224 may also comprise one or more output devices to convey information to the operator. These one or more output devices may comprise a display screen, gauges, light indicators (e.g., LEDs), etc. and within the user interface may include passive controls and active controls. Through these one or more output devices, the operator can obtain various information about the tree processing vehicle 10, such as Passive controls are used by the control unit 30 to show the operator the current state of key status indicators for the vehicle 10, such as an amount of fuel left in the fuel tank, a temperature of the prime mover 18, a hydraulic pressure in the hydraulic system 23, a current angular position of the arms $26_1$, $26_2$, a current processing height of the tree processing implement 14, a current rotational speed associated with the tree processing implement 14. Various other information may be conveyed to the operator.

Figure 18:
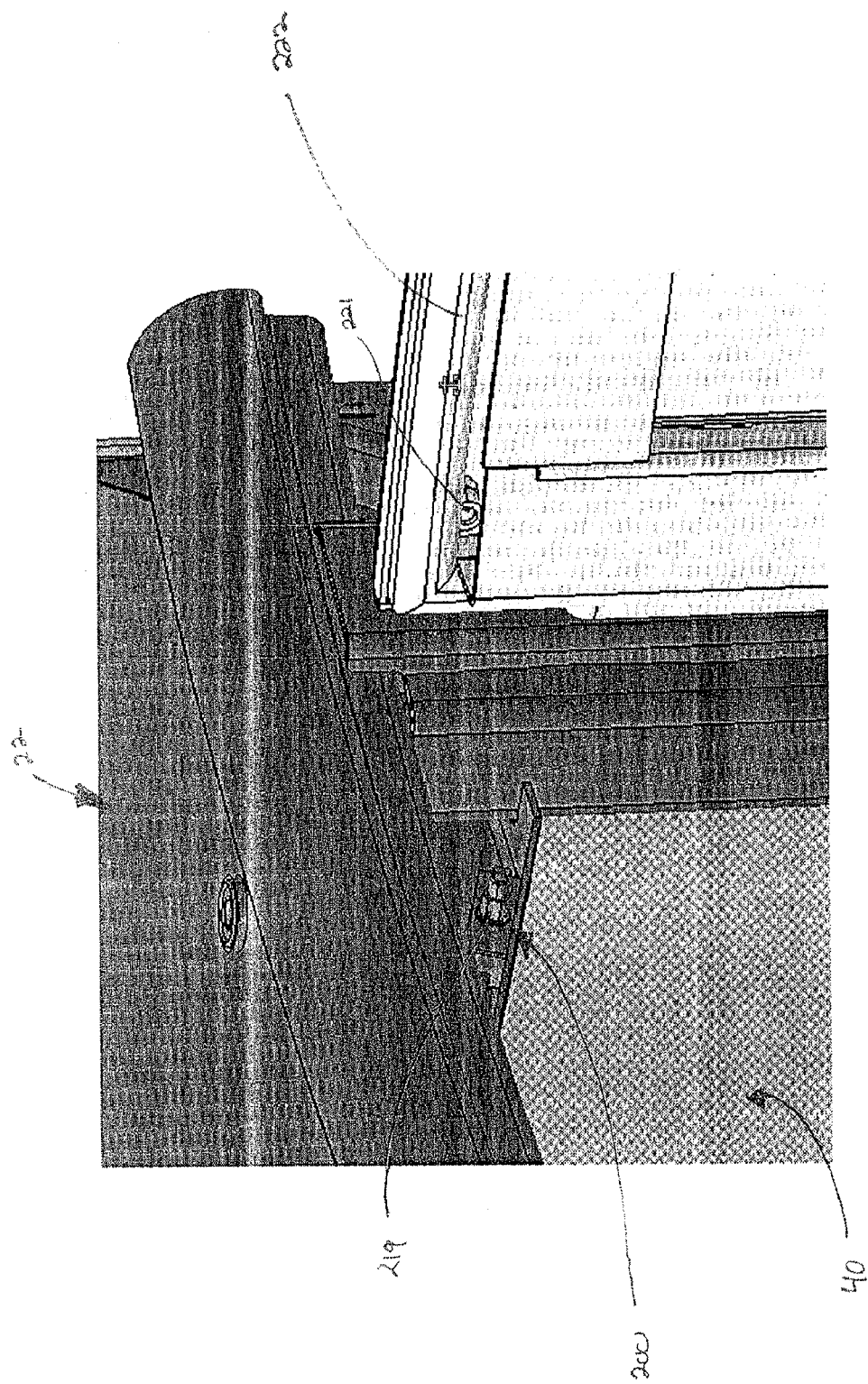
FIG. 18 shows a door sensor of the operator cabin of the tree processing vehicle of FIG. 1.
Figure 19:
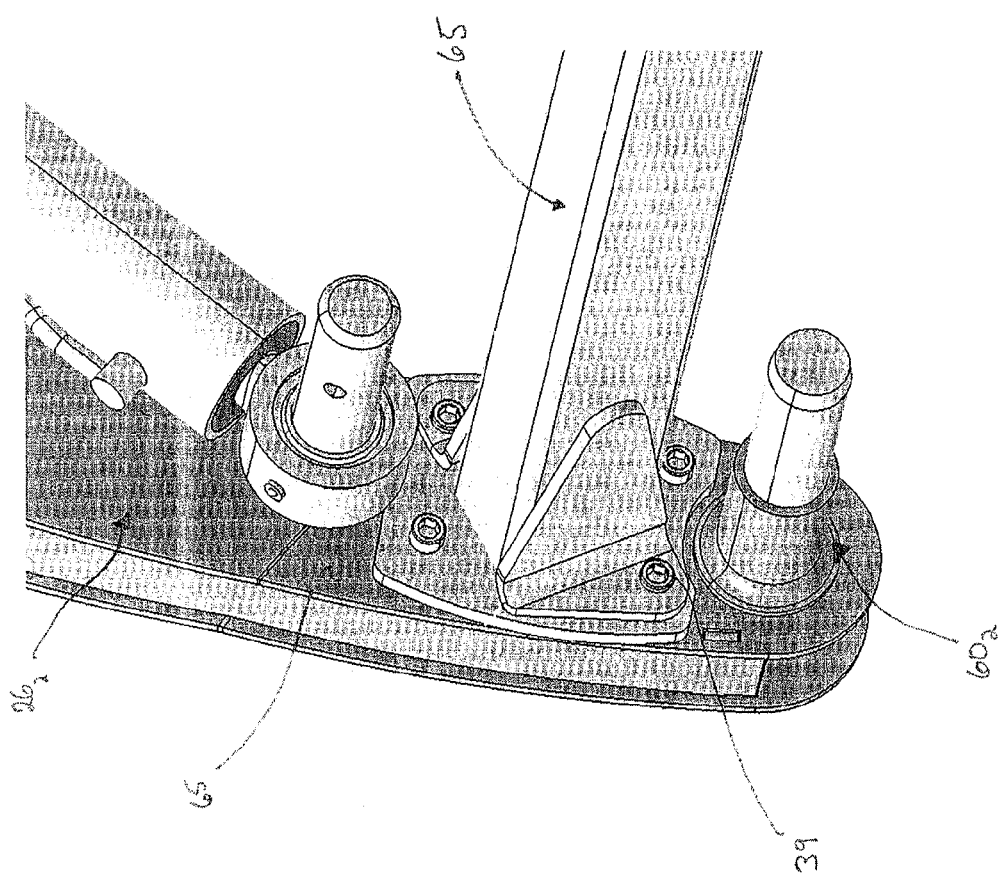

As shown in FIG. 18, in this embodiment, the tree processing vehicle 10 comprises a door sensor 200 for detecting that the door 222 is opened. The door sensor 200 communicates with the control unit 30 through a signal that indicates whether the door 222 is currently in an open position or a closed position. Based on this signal, the control unit 30 may allow or disable actions involving movement of the arms $26_1$, $26_2$, operation of the tree processing implement 14, and/or engagement of the tree processing vehicle 10, as described later. In this embodiment, the door sensor 200 comprises a contact sensing element 219 on the operator cabin 22 adjacent to the access opening 40 door 222. When the door 222 is closed, the contact sensing element 210 is in contact (e.g., is pressed upon by) a portion 221 of the door 222 and thus detects that the door 222 is closed. When the door 222 is open, the contact sensing element 210 does not contact (e.g., is not pressed upon by) the portion 221 of the door 222 and thus detects that the door 222 is open. In other embodiments, the door sensor 200 may comprise various other sensing elements, such as optical sensing elements, magnetic sensing elements, etc., to detect whether the door 222 is opened or closed.

The self-propelled carrier 12 is equipped with a set of movable access panels 228 that allow an operator, mechanic or technician to access mechanical components of the tree processing vehicle 10, for instance, to perform maintenance and/or repairs operations. For example, these mechanical components may include the prime mover 18, components of a power train that connects the prime mover 18 to the tracks $20_1$, $20_2$, and/or components of the hydraulic system 23. However, in some cases, even by moving the set of access panels 228, there may be certain mechanical components that may still be obstructed by the operator cabin 22. While the operator cabin 22 may be mounted to the frame 16 so as to be removable from the tree processing vehicle 10 to effect such repair and/or maintenance operations, disassembly and/or removal of the operator cabin 22 from the vehicle 10 for such operations can require considerable time and also render the vehicle 10 completely unusable during this period.

In this embodiment, the tree processing vehicle 10 comprises comprising a cabin tilting mechanism 50 coupled to the operator cabin 22 for tilting the operator cabin 22 forward between the arms $26_1$, $26_2$ to allow access to mechanical components of the tree processing vehicle 10 from behind the operator cabin 22. Thus, if an operator, mechanic or technician cannot access such components through the access panels 228 or it is neither safe nor efficient to do so, he/she may use the cabin tilting mechanism 50 to move the operator cabin 22 from a default working position to an inclined position in order to access these components.

More particularly, in this embodiment, the cabin tilting mechanism 50 comprises an actuator 55 coupled to the bottom side 35 of the operator cabin 22 that is activated by an operator, technician or mechanic by a control, which may be located outside the operator cabin 22. When activated, the actuator 55 raises part of the bottom side 35 of the operator cabin 22 in an upward motion, which results in the operator cabin 22 tilting forward at a pivot point on the frame 16. This inclined position allows the operator, technician or mechanic to access mechanical components of the tree processing vehicle 10 from behind the operator cabin 22, without having to disassemble or remove the operator cabin 22, in order to provide repair and/or maintenance to the vehicle 10. Once these operations are complete, the actuator 55 is deactivated, which results in a gradual and controlled downward motion of the operator cabin 22 back to its default working position. Advantageously, this ability to shift the operator cabin 22 between these two positions allows for easier and faster repair and/or maintenance operations that reduce an amount of time that the vehicle 10 is unavailable for use.

The arms $26_1$, $26_2$ comprise mounting portions providing mounting points $60_1$, $60_2$ at which the tree processing implement 14 is mounted and allow the tree processing implement 14 to be moved to different processing heights. More specifically, each of the arms $26_1$ and $26_2$ is connected to the frame 16 at a respective one of the pivot points $19_1$, $19_2$ to allow it to pivotally move across a range of angular positions, which causes the tree processing implement 14 to move across a range of processing heights.

The pivot points $19_1$, $19_2$ are located in a central area of the self-propelled carrier 12 between the rear portion of the frame 16 where the prime mover 18 is located and the front portion of the frame 16 where the operator cabin 22 is located. Thus, the pivot points $19_1$, $19_2$ are located aft of the front side 27 of the operator cabin 22 and, in this case, behind the operator cabin 22 altogether.

Each of the arms $26_1$, $26_2$ comprises a plurality of arm portions including: an arm portion 64 at one terminal end region that is used to provide rotation around its pivot point $19_1$, $19_2$; an arm portion 65 at an opposite terminal region that is used to provide its mounting point $60_1$, $60_2$; and an arm portion 66 between the arm portion 64 and the arm portion 65 that is used to translate the rotation of that arm at the arm portion 64 into movement of the tree processing implement 14 mounted to the arm portion 65. As further discussed below, these portions of each of the arms $26_1$, $26_2$, and specifically those of the arm $26_1$, are arranged to allow the door 222 to be opened when the arms $26_1$, $26_2$ are in a particular angular position.

Actuators 264 are mounted to the frame 16 and are also coupled to respective ones of the arms $26_1$, $26_2$. In this embodiment, the actuators 264 are coupled to the arm portion 66 of the arms $26_1$, $26_2$ at actuator coupling points $67_1$, $67_2$. Also, in this embodiment, the actuators 264 comprise hydraulic cylinders connected to the hydraulic system 23. In other embodiments, the actuators 264 may take on other forms.

The actuators 264 are controlled and synchronized by the control unit 30 to extend or retract based on commands input by the operator through the set of controls 224 in the operator cabin 22. When directed, these actuators 264 push or pull the arm portion 66 of each of the arms $26_1$, $26_2$, resulting in pivotal movement of the arms $26_1$, $26_2$ about their respective pivot points $19_1$, $19_2$ across a range of angular positions. Through these components, the arms $26_1$, $26_2$ may be raised or lowered between different angular positions during operation of the tree processing vehicle 10.

The arms $26_1$, $26_2$ can assume any one of a range of angular positions. This range of angular positions includes:

A plurality of angular positions where the arm 26 extends across at least part of the access opening 40 and the door 222 of the operator cabin 22 such that the arm 26, obstructs at least part of the access opening 40 and interferes with opening or closing of the door 222. Examples of two such angular positions are shown in FIGS. 7 to 12; and A particular angular position where the arm $26_1$ clears the access opening 40 and the door 222 thereby allowing the door 222 to be opened or closed. An example of this particular angular position is shown in FIGS. 1 to 6.

In this embodiment, in order to clear the access opening 40, when the arms $26_1$, $26_2$ are in the particular angular position, their arm portion 64 is oriented downwardly and forwardly, their arm portion 66 is oriented substantially horizontally and their arm portion 65 is oriented downwardly and forwardly. Also, when the arms $26_1$, $26_2$ are in the particular angular position, their mounting points $60_1$, $60_2$ are located below their actuator coupling points $67_1$, $67_2$, which are located below their pivot points $19_1$, $19_2$.

Figure 13:
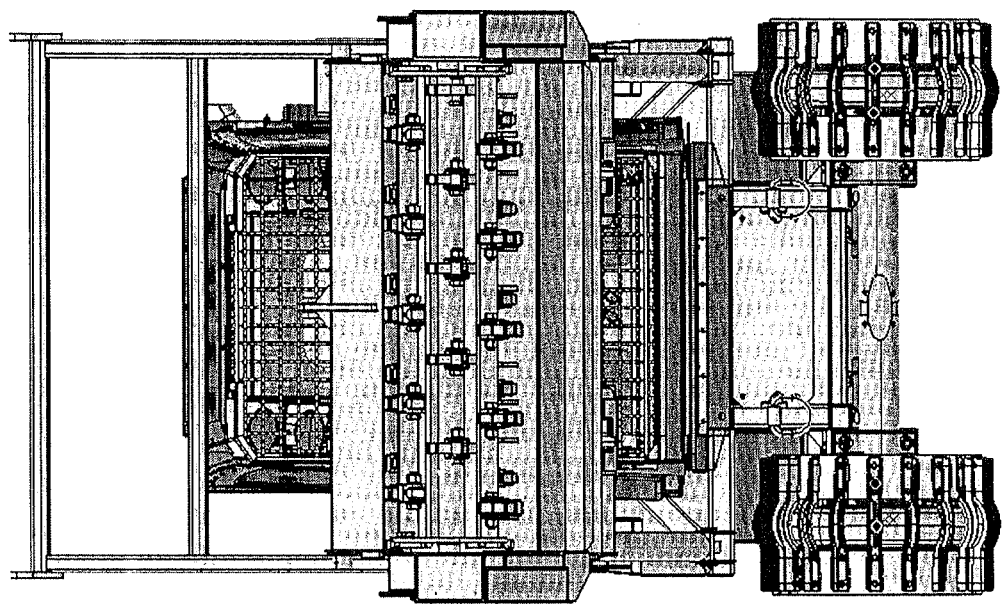
Figure 14:
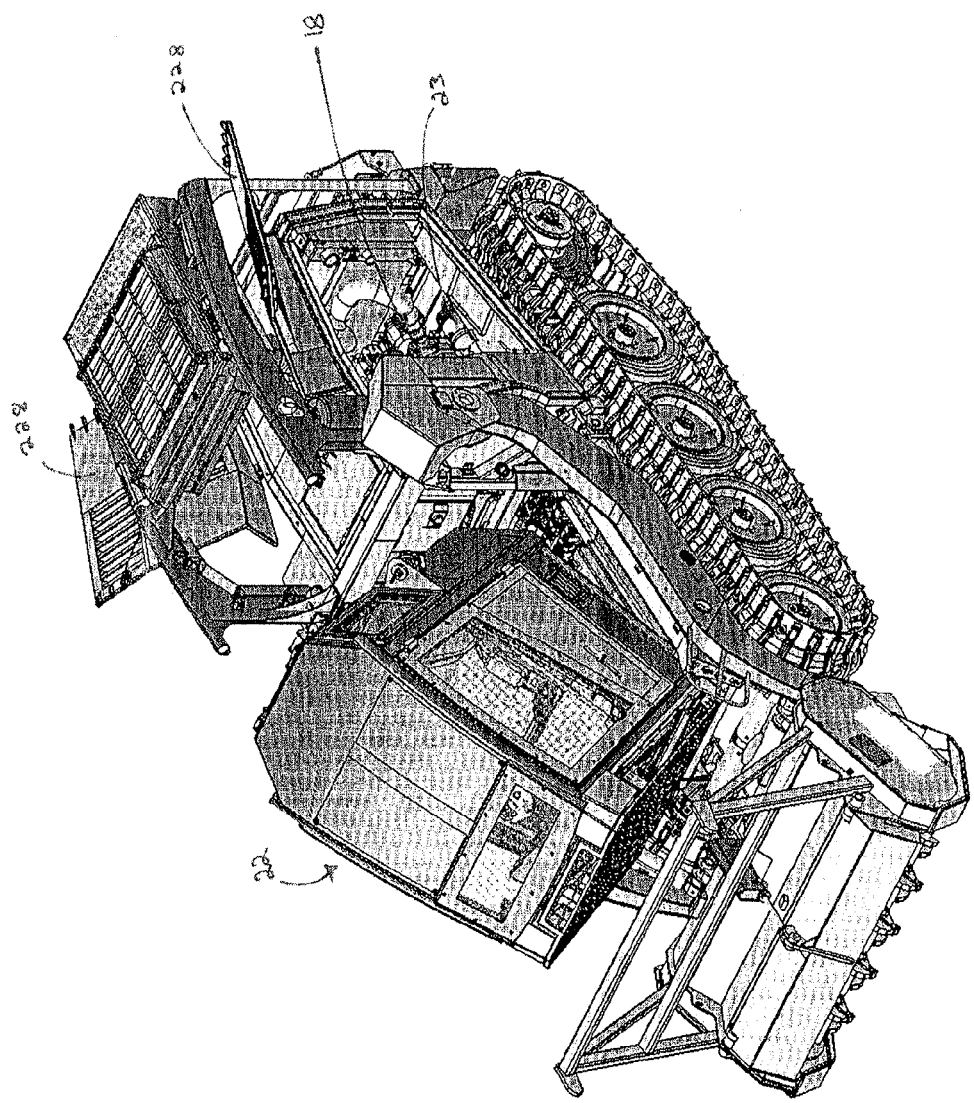
FIGS. 14 to 17 show perspective, left side and right side views of the tree processing vehicle of FIG. 1, with the operator cabin in a tilted position.
Figure 15:
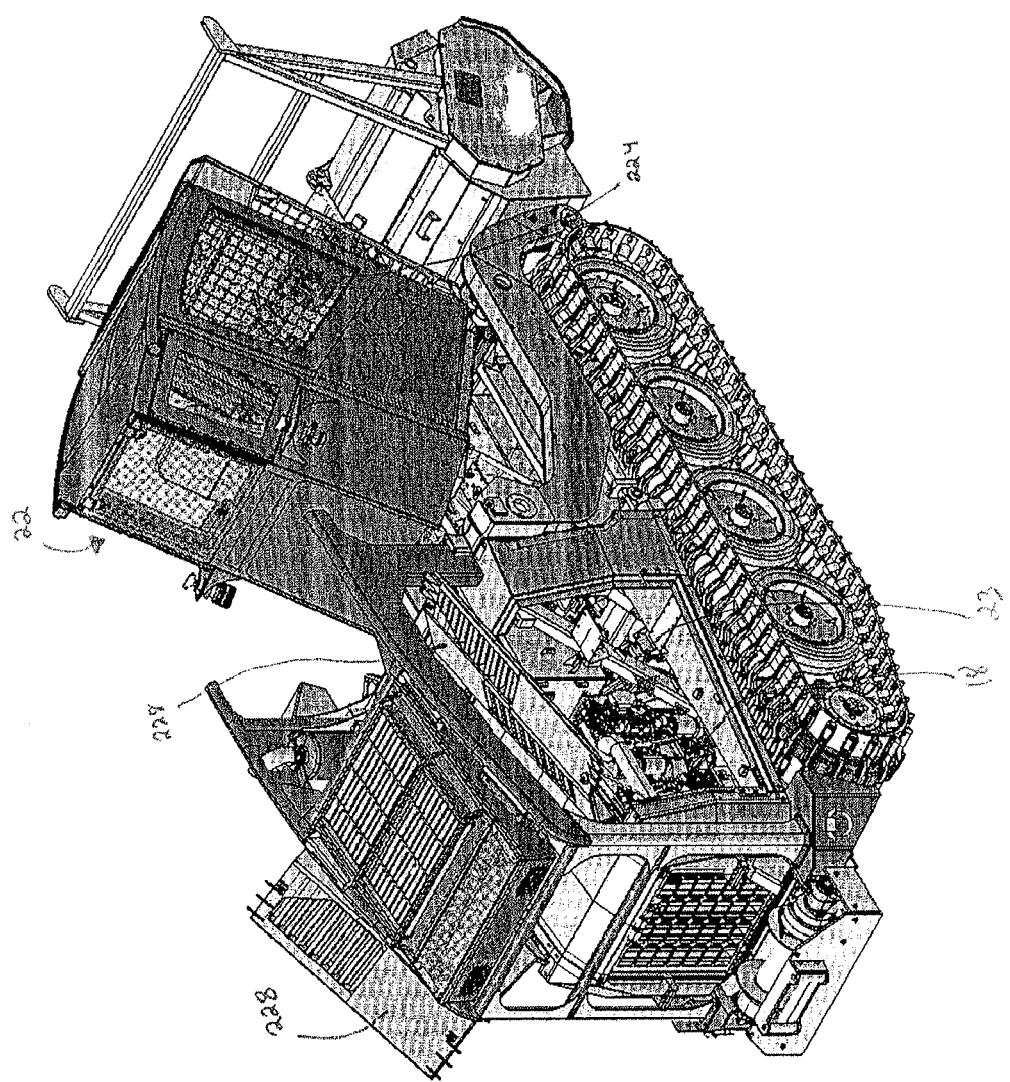
Figure 16:
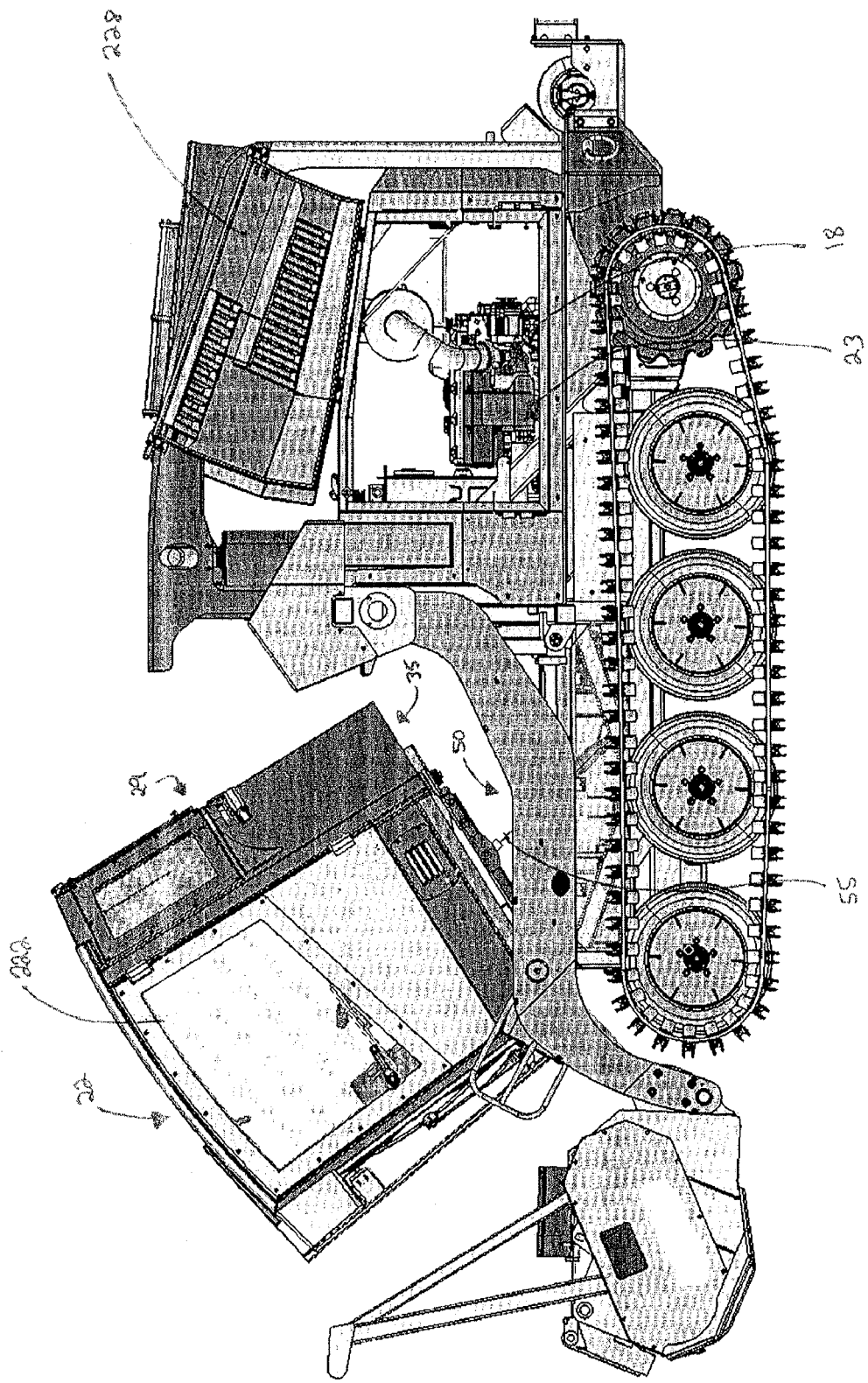
Figure 17:
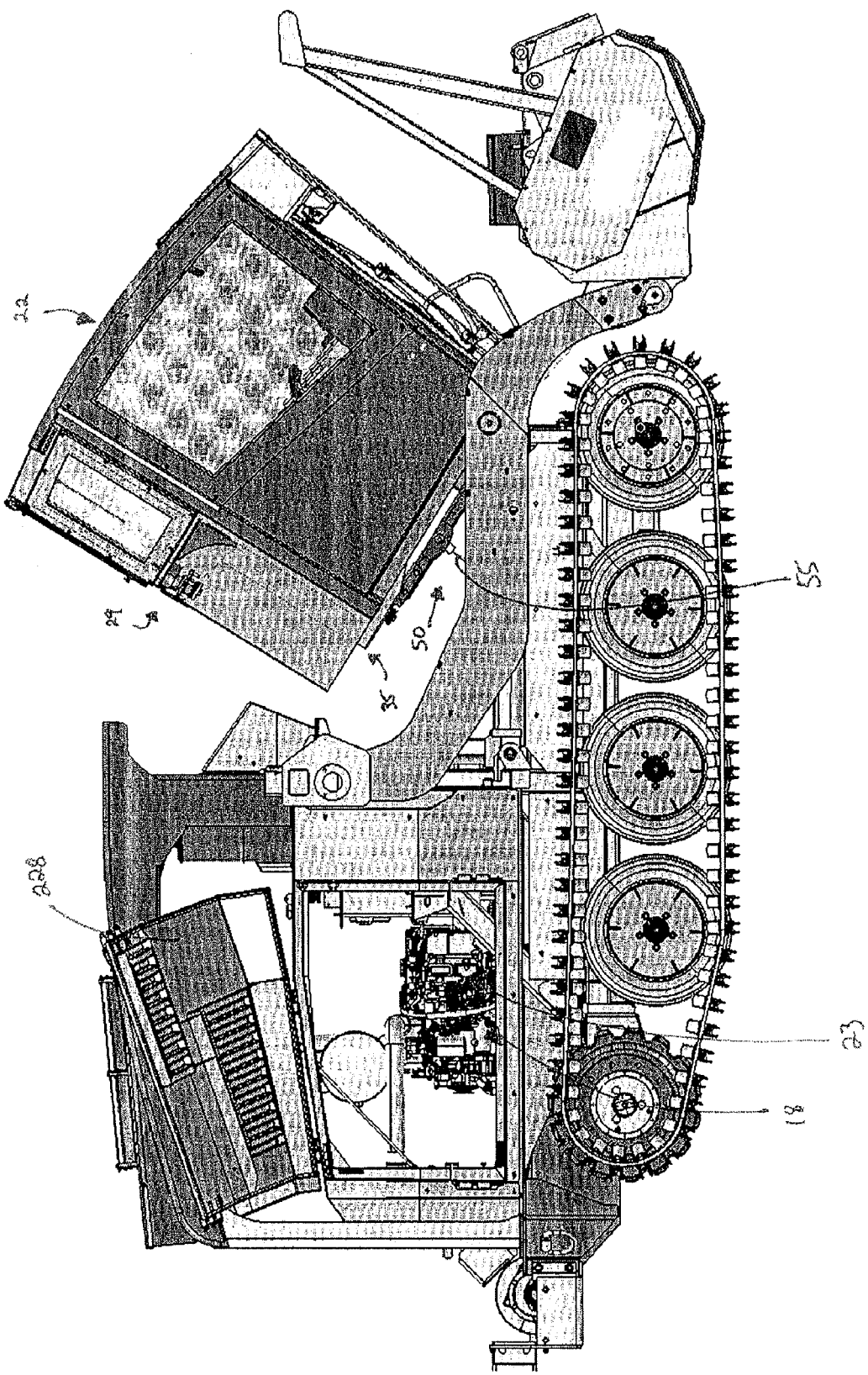

In addition to being mounted to the frame 16 at the pivot points $19_1$, $19_2$, the arms $26_1$, $26_2$ are interconnected to one another at their respective arm portion 65 proximate to their respective mounting points $60_1$, $60_2$ where the tree processing implement 14 is mounted. In this embodiment, as shown in FIGS. 13 and 14, this interconnection is effected by an arm interconnector 36 extending between the arms $26_1$, $26_2$ and secured to their respective arm portion 65 by one or more fasteners 39, in this case, four (4) bolts. The arm interconnector 36 may comprise a single structural member or a plurality of structural member-s themselves interconnected to one another (e.g., by welding or fasteners). As the arm interconnector 36 can be detached from the arms $26_1$, $26_2$ by unfastening the fasteners 39, the arms $26_1$, $26_2$ may be independently removed from and installed on the tree processing vehicle 12. This may prove to be easier in terms of weight to support and manipulate than if the arms $26_1$, $26_2$ would be interconnected by a permanently fixed interconnecting member (e.g., welded to or cast with the arms $26_1$, $26_2$). Moreover, the fasteners 39 may act to absorb part of the stresses experienced by the arms $26_1$, $26_2$ when the tree processing element 14 is mounted thereto.

Because the actuators 264 are connected to the control unit 30, the control unit 30 can determine which angular position the arms $26_1$, $26_2$ are currently occupying and in turn know their current orientation and location of their arm portions, particularly that adjacent to the access opening 40 and the door 222 of the operator cabin 22. The control unit 30 thus knows whether the arms $26_1$, $26_2$ are in proximity to the access opening 40 and the door 222 as well as the current position (open or closed) of the door 222 through the door sensor 200. As a result, the control unit 30 can identify when the angular position of the arms $26_1$, $26_2$ in relation to the position of the door 222 could potentially be hazardous for the operator and prevent these situations from occurring. In particular, the control unit 30 may identify a situation when the door 222 is opened by the operator while the arms $26_1$, $26_2$ are in motion in their range of angular positions, a situation that could endanger the operator. In such a situation, the control unit 30 may disable the actuators 264 (as well as the tree processing implement 14, which will be discussed later) to immobilize the arms $26_1$, $26_2$ to prevent harm from coming to the operator.

For example, assume that the operator is currently using the tree processing vehicle 10 to clear brush for a new trail that is being created in a park. The operator is using the set of controls 224 to pivotally move the arms $26_1$, $26_2$ (via their actuators 264) from the given angular position shown in FIGS. 1 to 6 to one of the angular positions shown in FIGS. 7 to 12 in order to position the tree processing implement 14 to remove a tree from the trail using a downward tree shredding stroke that will be explained shortly. During this operation, however, a dead branch from an adjacent tree suddenly falls onto the top side 33 of the operator cabin 22, obstructing the view of the operator from the windows 226 of the cabin 22. Under typical circumstances, the operator may first shut down the tree processing vehicle 10 manually and then remove the branch from this window 226 to ensure safe operations. However, in this example, assume that the shock of the branch hitting the operator cabin 22 distracted the operator who proceeds to open the door 222 without first manually shutting down the tree processing vehicle 10.

When the operator opens the door 222, the door sensor 200 detects the change in door position (i.e., from the closed position to the open position) and sends a "door open" signal to the control unit 30. Upon receipt of this signal, the control unit 30 determines which angular position the arms $26_1$, $26_2$ are currently in. The control unit 30 determines that the arms $26_1$, $26_2$ are currently in one of the angular positions shown in FIGS. 7 to 12 and therefore present a potential threat to the operator. As a result, the control unit 30 sends a "disable" signal to the actuators 264 that disables them and so prevents the arms $26_1$, $26_2$ from pivoting further. The operator is thus prevented from being potentially endangered through continued movement of the arms $26_1$, $26_2$.

In a similar manner, the control unit 30 may also prevent engagement of the tree processing vehicle 10 by the operator (such as by turning on the prime mover 18) unless the door 222 was currently identified by the door sensor 200 as being in the closed position. In this way, the control unit 30 may prevent an operator from placing themselves in danger from any movement the arms $26_1$, $26_2$ regardless of their position, as well as from operation of the tree processing implement 14 that is described in more detail below.

Turning now to the tree processing implement 14, it is configured to perform a tree processing function for processing trees, which can include standing large trees, small trees (e.g., those making up brushwood, tree stumps and roots, etc.), and/or fallen or cut trees. In this embodiment, the tree processing function is a shredding function whereby the tree processing implement 14 shreds portions of trees that it encounters. This can be useful, for example, to clear brush, shred down entire trees or convert forestry waste material into mulch.

The tree processing implement 14 is mounted to the arms $26_1$, $26_2$ to allow the operator to cause pivoting of these arms across their range of angular positions in order to position the tree processing implement 14 at different processing heights in relation to tree material (i.e., portions of trees, roots, brush, etc.) to be processed. Specifically, the processing height of the tree processing implement 14 may be changed by the operator by adjusting the angular position of the arms $26_1$, $26_2$. For example, when the arms $26_1$, $26_2$ are in any one of the angular positions shown in FIGS. 7 to 12, the processing height of the tree processing implement 14 is situated at a given point above ground level that may allow the tree processing implement 14 to be used to remove above-ground tree material, such as portions of tree trunks or tree branches and/or tall shrubs/hedges. In contrast, when the arms $26_1$, $26_2$ are in the particular angular position shown in FIGS. 1 to 6, the processing height of the tree processing implement 14 is situated near or at ground level, which may allow the processing implement 14 to be used to remove tree material that is at or below this level, such as undergrowth and/or tree stumps.

Moreover, because the arms $26_1$, $26_2$ may be moved across their range of angular positions, the tree processing implement 14 can be moved in a range of processing heights as the angular position of the arms $26_1$ and $26_2$ changes. For example, the tree processing implement 14 can be positioned at an initial processing height that is above ground level as shown in FIGS. 7 to 12 and then lowered to a lower processing height that is at ground level as shown in FIGS. 1 to 6 or even below by moving the arms $26_1$, $26_2$ between the angular positions shown in these figures. This allows the operator to use the tree processing implement 14 to process tree material efficiently through a downward tree shredding stroke, as further discussed later.

In this embodiment, the tree processing implement 14 comprises a rotary shredder 142 to shred tree material, a motor 144 to supply power to the rotary shredder 142, and a mounting system 146 to attach or detach the tree processing implement 14 to or from the arms 26₁, 26₂.

The rotary shredder 142 may be used process tree material by shredding them into smaller materials, hereafter referred to as mulch. The rotary shredder 142 is generally oriented perpendicular to a longitudinal axis of the tree processing vehicle 10 such that forward motion of the vehicle 10 results in processing of tree material in front of it while the rotary shredder 142 is in operation.

More particularly, in this embodiment, the rotary shredder 142 comprises a shredder frame 1422, a drive unit 1424, a set of cutting rotors 1428, a trap door 1426, a push bar 1423 and a material comb (not shown).

The shredder frame 1422 supports other components of the rotary shredder 142. In this case, the frame 1422 comprises two laterally spaced side walls, a rear wall, and a top wall, while front and bottom regions of the frame 1422 are intentionally left open to allow processing of trees portions and ejection of mulch resulting from this processing. The shredder frame 1422 encloses top and rear portions of the cutting rotors 1428, as well as extends in front of the cutting rotors 1428 by a certain extent to direct tree material to be processed into the path of the rotary shredder 142. The two side walls of the shredder frame 1422 are spaced with the same general lateral width as the arms 26₁, 26₂ so that the overall width of the frame 1422 (and the tree processing implement 14 in general) remains within the general width of the self-propelled carrier 12 to which it is mounted. The shredder frame 1422 is dimensioned to provide an efficient range of motion while allowing the operator to see potential obstructions and/or dangers on either side of the tree processing vehicle 10 even when the tree processing implement 14 is operating.

The push bar 143 is mounted on the top wall of the shredder frame 1422 and is tilted upwards and forwards to direct material towards other components of the rotary shredder 142, especially the cutting rotors 1428. When viewed from above, the push bar 143 resembles the capital letter H and comprises two (2) laterally spaced side bars generally parallel with the side walls of the shredder frame 1422 and that extend the length of the push bar 143 and one (1) or more front bar(s) that are perpendicular to the side bars but connected at their front and mid-sections and that extend the width of the push bar 143. The push bar 1423 may also include two (2) support bars that are parallel to the side bars but are connected on one terminal end to the mid-section of the front bars, and to the top side of the shredder frame 1442 at their other terminal end. The support bars may be connected to the top side of the shredder frame 1442 through rigid means (e.g., a pin mechanism) or through adjustable means (e.g. a hydraulic mechanism) to provide varying degrees of support to the other components of the push bar 1423. In cases where the push bar 1423 includes multiple front bars, several additional connecting bars may be placed at consistent intervals to reinforce the connection between the side bars and front bars of the push bar 1423 and so distribute loads or shocks evenly throughout components. Because the push bar 1423 extends both above and in front of the rotary shredder 142, it can direct tree material that is likewise above the processing height of the tree processing implement 14 towards the rotary shredder 142.

The drive unit 1424 is used to transfer power from the motor 144 to other components of the rotary shredder 142, and in particular to the cutting rotors 1428, for shredding tree material. In this embodiment, the drive unit 1424 comprises a drive pulley that is centrally pierced by a rotating shaft and which can accommodate a belt that is attached to a similar shaft at the motor 142. For example, the drive pulley may be adapted to mount a plurality of high-strength V-belts (e.g., six (6) V-belts) that can be used to transfer power from a similar pulley attached to the shaft of the motor 144. In other embodiments, the drive unit 1424 may comprise various other components to transfer power from the motor 144 to the rotary shredder 142.

The trap door 1426 is mounted at the front of the top wall of the shredder frame 1422 and has a vertical position that may be controlled during operation of the rotary shredder 142 by an actuator (e.g., a hydraulic actuator). This actuator may be controlled by the operator through the set of control 224 in the operator cabin 22 or by the control unit 30 independently of the operator. The trap door 1426 can be used to control the coarseness of the mulch generated during operations of the rotary shredder 142. For example, when the trap door 1426 is set to a lower position during operation of the tree processing implement 14, tree material entering the rotary shredder 142 will remain inside for a longer duration, resulting in finer mulch than if the trap door 1426 is set at a higher position.

The material comb (not shown) comprises a section of perforated metal mesh that is attached to and runs along the entire rear width of the rear wall of the rotary shredder 142. As a result of its position, the material comb sits behind the other components of the rotary shredder 142 (in particular the cutting rotors 1428) and can be used, for example, to: help retain pieces of tree material that were not completely converted to mulch within the rotary shredder 142 so they can continue to be processed; help evenly distribute any recently produced mulch as the vehicle 10 (and the rotary shredder 142) moves in a particular forward direction; or help prevent tree material being processed from being ejected backwards during operations.

The set of cutting rotors 1428 converts tree material to be processed within the rotary shredder 142 into mulch. In this embodiment, each cutting rotor 1428 comprises a centrally perforated cylinder upon which a set of cutting teeth 1430 are mounted on its exterior. A shaft extending from the drive pulley of the drive unit 1424 runs through the central part of each cutting rotor 1428 and connects it so that the power supplied by the drive unit 1424 via the motor 144 may rotate the cutting rotor 1428.

The set of cutting teeth 1430 are suitably mounted on the exterior surface of the cutting rotor 1428 so that its forward rotation will result in one or more cutting teeth coming into contact with tree materials to be processed. Since each cutting rotor 1428 is driven by the drive unit 1424 at speed, any tree material to be processed will repeatedly come into contact with the cutting teeth 1430 of the rotor 1428 and be broken down into increasingly smaller fragments. When the fragments are too small to be broken down further (i.e., they have become mulch), the rotation of the cutting rotors 1428 imparts enough momentum to the fragments that they force the mulch behind the rotary shredder 142 where it can distributed by the material comb behind the tree processing implement 14, or ejects it out in front of the implement 14. The cutting teeth 1430 may be made from a strong durable material, such as double carbide steel or other suitable metal.

The motor 144 is used to provide power to the rotary shredder 142. In this embodiment, the motor 144 comprises a hydraulic motor that is in fluid communication with the hydraulic system 23 on the self-propelled carrier 12 via a hydraulic connection comprising one or more hydraulic cables (not shown). The pressure and direction of the flow of the hydraulic fluid that is applied to the hydraulic motor is controlled by the operator via the set of controls 224 and/or the control unit 30 either in conjunction with or independently of the operator.

More particularly, in this embodiment, the motor 144 has a shaft associated with a pulley so as to cause rotation of the shaft and pulley when activated. The pulley used in the motor 144 is similar to the pulley in the drive unit 1424 and forms the other end of the V-belt that connects these two components. As a result, the rotation of the motor 144 during operation drives the rotary shredder 142 via the V-belts that are connecting their respective attached pulleys. Through these components, the tree processing implement 14 can be provided with power to perform processing operations on tree material.

The mounting system 146 allows the tree processing implement 14 to be mounted to the arms $26_1$, $26_2$ of the self-propelled carrier 12. In this embodiment, the mounting system 146 comprises different types of attachments between the tree processing implement 14 and the self-propelled carrier 12, such as:

- A physical attachment that secures the tree processing implement 14 to the arms $26_1$, $26_2$;
- A control attachment that allows the control unit 30 to monitor operation of the tree processing implement 14 and also allows the operator to control certain aspects of its operation, such as rotation speed of the cutting rotors 1428; and
- A power attachment that allows electrical and hydraulic components on the self-propelled carrier 12 to supply electrical power pressurized hydraulic fluid to the tree processing implement 14.

Also, the mounting system 146 may allow the control unit 30 to identify when certain conditions involving the operation of the tree processing implement 14 (and specifically the rotary shredder 142) in relation to the position of the door 222 exist that could potentially endanger the operator and prevent them from occurring. In particular, the control unit 30 can determine when the operation of the tree processing implement 14 should be shut down (or conversely, not permitted to start) when the door 226 is opened. For example, assume the operator opens the door 222 while the tree processing implement 14 is in operation in order to clear a dead branch that has fallen on top of the operator cabin 22, as in a previously considered example. Upon receipt of the "door open" signal, the control unit 30 may determine the current operational status of the tree processing implement 14, and more specifically the status of the rotary shredder 142. Since these are currently in operation, the control unit 30 may send a signal to immediately shut down the operation of the rotary shredder 142 and disable further use of the tree processing implement 14 until the door sensor 200 identified that the door 222 has been returned to the closed position.

An example of operation of the tree processing implement 14 will now be presented. In this example, assume that the tree processing vehicle 10 is being used to clear trees from a path in a park. Further assume that the height of a tree to be processed lies within the range of processing heights of the tree processing implement 14 that is reachable through the range of angular positions of the arms $26_1$, $26_2$. Further assume that the operator has the arms $26_1$, $26_2$ currently in the particular angular position shown in FIGS. 1 to 6 and that power is being supplied to the motor 144 of the tree processing implement 14 that results in rotation of the cutting rotors 1428.

Because the operator sees that the tree to be processed lies within the range of processing heights of the tree processing implement 14, he/she raises the tree processing implement 14 to match this level by changing the angular position of the arms $26_1$, $26_2$ to a corresponding angular position, which may be one as shown in FIGS. 7 to 12. The operator does not have to raise the arms $26_1$, $26_2$ so high that the tree processing implement 14 is positioned far above the top of the tree, since the push bar 1423 mounted on the shredder frame 1422 will help to direct the tree branches and trunk into the other components of the tree processing implement 14, particularly the rotary shredder 142.

With the tree processing implement 14 now suitably positioned, the operator begins to lower the arms $26_1$, $26_2$ from their initial angular position towards the angular position shown in FIGS. 1 to 6. This lowers the tree processing implement 14 and results in at least a portion of the tree coming into contact with the push bar 1423, which directs that portion into the rotary shredder 142. Once the portion of the tree to be processed being pushed down by the push bar 1423 reaches a certain point within the rotary shredder 142, the cutting teeth 1430 of the rotating cutting rotors 1428 meet the branches, leaves and trunk of the tree, shredding them into mulch.

Meanwhile, the operator continues the descent of the tree processing implement 14, resulting in an increasing amount of the tree being shredded and converted to mulch. Depending on the size of the tree and the thickness of the tree trunk being processed, the operator (and/or the control unit 30) may adjust the rotational speed of the cutting rotors 1428 to provide more or less power to the rotary shredder 142 through its motor 144. For example, the operator may decide to increase power to the tree processing implement 14 in order to process the tree trunk, which is a much more solid mass than the branches and leaves in the upper portion of the tree.

The operator may continue the descent of the tree processing implement 14 until the entire tree has been processed and the arms $26_1$, $26_2$ have returned to the particular angular position shown in FIGS. 1 to 6. It should be understood that although the tree processing implement 14 may now be at ground level, the cutting rotors 1428 of the rotary shredder that extend below the bottom of the rotary shredder 142 continue to rotate. This can allow the operator to process the tree stump and root ball in whole or in part and convert this to mulch as well.

At this point, the entire tree has been converted to mulch in a single downward tree shredding stroke. It will be appreciated that applying the same downward tree shredding stroke to a larger tree may only have processed a portion of the tree, and that multiple downward tree shredding strokes may be needed to process a tree in its entirety. It will also be appreciated that, generally, one or more downward tree shredding strokes may be used to shred at least a portion of a tree, which may be an entirety of the tree or only a limited portion thereof.

Having described the tree processing vehicle 10, an example of its operation will now be presented. In this example, assume that the tree processing vehicle 10 is being used to help fight an ongoing forest fire. In particular, the tree processing vehicle 10 is being used to create a fire line, which is an area devoid of flammable material and within which a forest fire cannot spread. Fire lines are set up ahead of a forest fire in order to contain it, as well as provide open areas that allow fire fighters and fire fighting vehicles access to areas where the fire is burning.

Further assume that the tree processing vehicle 10 is currently disabled, as it has just been transported to a point at which the fire line will begin. Further assume that the arms $26_1$, $26_2$ are currently set in the particular angular position shown in FIGS. 1 to 6 in order to allow an operator to enter into the operator cabin 22.

The operator opens the door 222 covering the access opening 40, enters into the operator cabin 22 via the access opening 40, and then attempts to enable the vehicle's operation by engaging the prime mover 18. At this point, the control unit 30 determines the position of the door 222 via the door sensor 200 to determine whether the prime mover 18 and/or other vehicle functionality (including the tree processing implement 14) can be engaged. Because the operator has not closed the door 222, the door sensor 200 sends a "door open" signal to the control unit 30. Based on this signal, the control unit 30 prevents the tree processing vehicle 10 from being enabled and prompts the operator (such as by using a visual or auditory alarm) to close the door 222 in order to start the vehicle 10.

Upon receiving this prompt, the operator closes the door 222 and attempts to enable the tree processing vehicle 10 by engaging the prime mover 18. The control unit 30 repeats the process described above, but since the door sensor 200 is now sending a "door closed" signal, the control unit 30 allows the prime mover 18 to be engaged and all vehicle functionality (including the tree processing implement 14) is enabled.

The operator uses the set of controls 224 in the operator cabin 22 to do the following actions:

Engage the tracks $20_1$ and/or $20_2$ and direct the tree processing vehicle 10 to follow the general direction for the fire line to be created.

If necessary, move the arms $26_1$, $26_2$ in their range of angular positions to move the tree processing implement 14 at one or more processing heights in order to process tree materials from the immediate area of the fire line in front of the tree processing vehicle 10.

If necessary, engage the operation of the tree processing implement 14 by supplying pressurized hydraulic fluid to the motor 144 and start the rotary shredder 142. The operator may also set the rotation speed of the cutting rotors 1428 based on the trees, brush and other undergrowth to be cleared from the immediate area.

Assume that the immediate area of the fire line in front of the tree processing vehicle 10 contains only potentially flammable material such as brush and other undergrowth. As a result, the operator leaves the arms $26_1$, $26_2$ in the particular angular position shown in FIGS. 1 to 6 while the tree processing vehicle 10 is moving so that the tree processing implement 14 can convert these materials to mulch. This ability to clear brush and other undergrowth while the tree processing vehicle 10 is in motion may allow the operator to clear an area for the fire line efficiently, allowing manpower and/or other resources to be directed towards fighting the forest fire than for clearing fire lines.

When the operator encounters trees or taller undergrowth (such as tall shrubs or hedges) along the fire line, he/she can stop the motion of the tree processing vehicle 10 and then uses one or more downward tree shredding strokes identical as described earlier to process and convert such tree materials to mulch via the tree processing implement 14. Once these materials are processed and converted to mulch, the operator readjusts the arms $26_1$, $26_2$ and re-engages the tracks $20_1$, $20_2$ to continue to clear the fire line of potentially flammable materials. The ability of being able to clear a tree and/or other tall undergrowth using one or more downward tree shredding strokes can save critical time in creating fire lines while allowing other manpower and/or resources to be directed towards actively fighting the forest fire.

Once the operator has cleared the fire line of all potentially flammable material, he/she can use the tracks $20_1$, $20_2$ to drive the tree processing vehicle 10 to the start of a next fire line (if this point is in close proximity to the end of the current fire line) or return to an area where the tree processing vehicle 10 can be transported to its next assignment more efficiently, such as on a trailer attached to a truck.

While in this embodiment the tree processing implement 14 is configured to perform a shredding function to shred tree materials, it is to be understood that, in other embodiments, the tree processing vehicle 10 may be equipped with various other tree processing implements mounted to its arms $26_1$, $26_2$ for performing other tree processing functions. For example, the tree processing vehicle 10 may be equipped with a tree processing implement comprising a grapple to perform a grappling function to grapple tree materials and transport them to another location.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A tree processing vehicle comprising:
   a prime mover;
   a pair of tracks for propelling the tree processing vehicle, the prime mover being in a driving relationship with the tracks;
   an operator cabin comprising:
      a front side, a rear side, and a pair of lateral sides between the front side and the rear side, a first one of the lateral sides defining an access opening allowing an operator to enter or exit the operator cabin;
      a door for closing the access opening; and
      a set of controls for allowing the operator to control the tree processing vehicle;
   a pair of arms pivotally movable across a range of angular positions, the range of angular positions including a first angular position in which a first one of the arms extends across at least part of the access opening and a second angular position in which the first one of the arms clears the access opening thereby allowing the door to be opened or closed; and
   a tree processing implement mounted to the arms such that, when the arms pivot across the range of angular positions, the tree processing implement moves across a range of processing heights, the arms being pivotally movable in the range of angular positions to move the tree processing implement in the range of processing heights such as to impart to the tree processing implement a downward tree shredding stroke during which the tree processing implement shreds at least a portion of a tree.

2. A tree processing vehicle as claimed in claim 1, comprising:
   a sensor for detecting that the door is opened; and
   a control unit for causing the arms to be immobilized and prevented from pivoting when the sensor detects that the door is opened.

3. A tree processing vehicle as claimed in claim 2, comprising at least one actuator coupled to the arms for causing the arms to pivotally move across the range of angular positions, the control unit being configured to disable the at least one actuator when the sensor detects that the door is opened to immobilize the arms and prevent the arms from pivoting.

4. A tree processing vehicle as claimed in claim 3, each of the at least one actuator comprising a hydraulic actuator.

5. A tree processing vehicle as claimed in claim 2, the control unit being configured to disable a shredding function of the tree processing implement when the sensor detects that the door is opened.

17

6. A tree processing vehicle as claimed in claim 5, the tree processing implement comprising a rotary shredder and a motor for imparting rotation to the rotary shredder, the control unit being configured to prevent the motor from imparting rotation to the rotary shredder when the sensor detects that the door is opened to disable the shredding function of the tree processing implement.

7. A tree processing vehicle as claimed in claim 6, wherein the motor is a hydraulic motor.

8. A tree processing vehicle as claimed in claim 1, the first one of the arms comprising a first arm portion pivotally movable about a pivot point and a second arm portion located adjacent to and below the access opening and below the pivot point when the first one of the arms is in the second angular position.

9. A tree processing vehicle as claimed in claim 8, the first one of the arms comprising a third arm portion to which the tree processing implement is mounted at a mounting point, the mounting point being located below the second arm portion when the first one of the arms is in the second angular position.

10. A tree processing vehicle as claimed in claim 9, the first arm portion being oriented downwardly and forwardly, the second arm portion being oriented substantially horizontally, and the third arm portion being oriented downwardly and forwardly when the first one of the arms is in the second angular position.

11. A tree processing vehicle as claimed in claim 1, comprising at least one actuator coupled to the arms at a coupling point for causing the arms to pivotally move across the range of angular positions, the first one of the arms being pivotally movable about a pivot point, the tree processing implement being mounted to the first one of the arms at a mounting point, the mounting point being located below the coupling point which is located below the pivot point when the first one of the arms is in the second angular position.

12. A tree processing vehicle as claimed in claim 1, comprising a cabin tilting mechanism coupled to the operator cabin for tilting the operator cabin forward between the arms to allow access to mechanical components of the tree processing vehicle from behind the operator cabin.

13. A tree processing vehicle as claimed in claim 12, the cabin tilting mechanism comprising a hydraulic actuator coupled to the operator cabin for tilting the operator cabin.

14. A tree processing vehicle as claimed in claim 1, comprising an arm interconnector interconnecting the arms, the arm interconnector extending between the arms and being secured to the arms by at least one fastener.

15. A tree processing vehicle comprising:
a prime mover;
a pair of tracks for propelling the tree processing vehicle, the prime mover being in a driving relationship with the tracks;
an operator cabin comprising:
    a front side, a rear side, and a pair of lateral sides between the front side and the rear side, a first one of the lateral sides defining an access opening allowing an operator to enter or exit the operator cabin;
    a door for closing the access opening; and
    a set of controls for allowing the operator to control the tree processing vehicle;
a pair of arms pivotally movable across a range of angular positions, the range of angular positions including a first angular position in which a first one of the arms extends across at least part of the access opening and a second angular position in which the first one of the arms clears the access opening thereby allowing the door to be opened or closed, each of the arms comprising a mounting portion to which a tree processing implement is mountable such that, when the arms pivot across the range of angular positions, the tree processing implement moves across a range of processing heights at which the tree processing implement can perform a tree processing function.

16. A tree processing vehicle as claimed in claim 15, the tree processing function of the tree processing implement being a shredding function, the arms being pivotally movable in the range of angular positions to move the tree processing implement in the range of processing heights such as to impart to the tree processing implement a downward tree shredding stroke during which the tree processing implement shreds at least a portion of a tree.

17. A tree processing vehicle as claimed in claim 16, comprising:
a sensor for detecting that the door is opened; and
a control unit for causing the arms to be immobilized and prevented from pivoting when the sensor detects that the door is opened.

18. A tree processing vehicle as claimed in claim 17, comprising at least one actuator coupled to the arms for causing the arms to pivotally move across the range of angular positions, the control unit being configured to disable the at least one actuator when the sensor detects that the door is opened to immobilize the arms and prevent the arms from pivoting.

19. A tree processing vehicle as claimed in claim 18, each of the at least one actuator comprising a hydraulic actuator.

20. A tree processing vehicle as claimed in claim 17, the control unit being configured to disable the tree processing function of the tree processing implement when the sensor detects that the door is opened.

21. A tree processing vehicle as claimed in claim 20, the tree processing function of the tree processing implement being a shredding function, the tree processing implement comprising a rotary shredder and a motor for imparting rotation to the rotary shredder, the control unit being configured to prevent the motor from imparting rotation to the rotary shredder when the sensor detects that the door is opened to disable the shredding function of the tree processing implement.

22. A tree processing vehicle as claimed in claim 21, wherein the motor is a hydraulic motor.

23. A tree processing vehicle as claimed in claim 15, the first one of the arms comprising a first arm portion pivotally movable about a pivot point and a second arm portion located adjacent to and below the access opening and below the pivot point when the first one of the arms is in the second angular position.

24. A tree processing vehicle as claimed in claim 23, the first one of the arms comprising a third arm portion to which the tree processing implement is mounted at a mounting point, the mounting point being located below the second arm portion when the first one of the arms is in the second angular position.

25. A tree processing vehicle as claimed in claim 24, the first arm portion being oriented downwardly and forwardly, the second arm portion being oriented substantially horizontally, and the third arm portion being oriented downwardly and forwardly when the first one of the arms is in the second angular position.

26. A tree processing vehicle as claimed in claim 15, comprising at least one actuator coupled to the arms at a coupling point for causing the arms to pivotally move across the range of angular positions, the first one of the arms being pivotally movable about a pivot point, the tree processing implement being mountable to the first one of the arms at a mounting point of the mounting portion of the first one of the arms, the mounting point being located below the coupling point which is located below the pivot point when the first one of the arms is in the second angular position.

27. A tree processing vehicle as claimed in claim 15, comprising a cabin tilting mechanism coupled to the operator cabin for tilting the operator cabin forward between the arms to allow access to mechanical components of the tree processing vehicle from behind the operator cabin.

28. A tree processing vehicle as claimed in claim 27, the cabin tilting mechanism comprising a hydraulic actuator coupled to the operator cabin for tilting the operator cabin.

29. A tree processing vehicle as claimed in claim 15, comprising an arm interconnector interconnecting the arms, the arm interconnector extending between the arms and being secured to the arms by at least one fastener.

30. A method for processing trees, comprising:
 approaching a tree processing vehicle comprising:
  a prime mover;
  a pair of tracks for propelling the tree processing vehicle, the prime mover being in a driving relationship with the tracks;
  an operator cabin comprising:
   a front side, a rear side, and a pair of lateral sides between the front side and the rear side, a first one of the lateral sides defining an access opening allowing an operator to enter or exit the operator cabin;
   a door for closing the access opening; and
   a set of controls for allowing the operator to control the tree processing vehicle;
  a pair of arms pivotally movable across a range of angular positions, the range of angular positions including a first angular position in which a first one of the arms extends across at least part of the access opening and a second angular position in which the first one of the arms clears the access opening thereby allowing the door to be opened or closed; and
  a tree processing implement mounted to the arms such that, when the arms pivot across the range of angular positions, the tree processing implement moves across a range of processing heights;
 opening the door while the arms are in the second angular position;
 entering the operator cabin;
 closing the door;
 using the set of controls to move the tree processing vehicle and cause the arms to pivotally move in the range of angular positions to move the tree processing implement in the range of processing heights such as to impart to the tree processing implement a downward tree shredding stroke during which the tree processing implement shreds at least a portion of a tree;
 opening the door while the arms are in the second angular position; and
 exiting the operator cabin.

31. A tree processing vehicle comprising:
 a prime mover;
 a pair of tracks for propelling the tree processing vehicle, the prime mover being in a driving relationship with the tracks;
 an operator cabin comprising:
  a front side, a rear side, and a pair of lateral sides between the front side and the rear side, a given one of the front side, the rear side, and the lateral sides of the operator cabin defining an access opening allowing an operator to enter or exit the operator cabin;
  a door for closing the access opening;
  a set of controls for allowing the operator to control the tree processing vehicle;
 a pair of arms pivotally movable across a range of angular positions;
 a tree processing implement mounted to the arms such that, when the arms pivot across the range of angular positions, the tree processing implement moves across a range of processing heights, the arms being pivotally movable in the range of angular positions to move the tree processing implement in the range of processing heights such as to impart to the tree processing implement a downward tree shredding stroke during which the tree processing implement shreds at least a portion of a tree; and
 a cabin tilting mechanism coupled to the operator cabin for tilting the operator cabin forward between the arms to allow access to mechanical components of the tree processing vehicle from behind the operator cabin.

32. A tree processing vehicle as claimed in claim 31, the cabin tilting mechanism comprising a hydraulic actuator coupled to the operator cabin for tilting the operator cabin.

33. A tree processing vehicle as claimed in claim 31, the given one of the front side, the rear side, and the lateral sides of the operator cabin being a given one of the lateral sides of the operator cabin.

34. A tree processing vehicle as claimed in claim 31, a given one of the arms comprising a first arm portion pivotally movable about a pivot point and a second arm portion located below the access opening and below the pivot point when the given one of the arms is in a given one of the angular positions.

35. A tree processing vehicle as claimed in claim 34, the given one of the arms comprising a third arm portion to which the tree processing implement is mounted at a mounting point, the mounting point being located below the second arm portion when the given one of the arms is in the given one of the angular positions.

36. A tree processing vehicle as claimed in claim 35, the first arm portion being oriented downwardly and forwardly, the second arm portion being oriented substantially horizontally, and the third arm portion being oriented downwardly and forwardly when the given one of the arms is in the given one of the angular positions.

37. A tree processing vehicle as claimed in claim 31, comprising at least one actuator coupled to the arms at a coupling point for causing the arms to pivotally move across the range of angular positions, a given one of the arms being pivotally movable about a pivot point, the tree processing implement being mountable to the given one of the arms at a mounting point of the mounting portion of the given one of the arms, the mounting point being located below the coupling point which is located below the pivot point when the given one of the arms is in a given one of the angular positions.

38. A tree processing vehicle as claimed in claim 31, comprising a frame and an access panel located on a lateral side of the frame behind the operator cabin, the access panel being movable between a closed position and an open position to allow access to mechanical components of the tree processing vehicle from the lateral side of the frame.

39. A tree processing vehicle as claimed in claim 38, the access panel being a first access panel and the lateral side of the frame being a first lateral side of the frame, the tree processing vehicle comprising a second access panel located on a second lateral side of the frame behind the operator cabin, the second access panel being movable between a closed position and an open position to allow access to mechanical components of the tree processing vehicle from the second lateral side of the frame.

40. A tree processing vehicle comprising:
- a prime mover;
- a pair of tracks for propelling the tree processing vehicle, the prime mover being in a driving relationship with the tracks;
- an operator cabin comprising:
  - a front side, a rear side, and a pair of lateral sides between the front side and the rear side, a given one of the front side, the rear side, and the lateral sides defining an access opening allowing an operator to enter or exit the operator cabin;
  - a door for closing the access opening; and
  - a set of controls for allowing the operator to control the tree processing vehicle;
- a pair of arms pivotally movable across a range of angular positions;
- a tree processing implement mounted to the arms such that, when the arms pivot across the range of angular positions, the tree processing implement moves across a range of processing heights, the arms being pivotally movable in the range of angular positions to move the tree processing implement in the range of processing heights such as to impart to the tree processing implement a downward tree shredding stroke during which the tree processing implement shreds at least a portion of a tree;
- a sensor for detecting that the door is opened; and
- a control unit for causing the arms to be immobilized and prevented from pivoting when the sensor detects that the door is opened.

41. A tree processing vehicle as claimed in claim 40, comprising at least one actuator coupled to the arms for causing the arms to pivotally move across the range of angular positions, the control unit being configured to disable the at least one actuator when the sensor detects that the door is opened to immobilize the arms and prevent the arms from pivoting.

42. A tree processing vehicle as claimed in claim 41, each of the at least one actuator comprising a hydraulic actuator.

43. A tree processing vehicle as claimed in claim 40, the given one of the front side, the rear side, and the lateral sides being a given one of the lateral sides.

44. A tree processing vehicle as claimed in claim 40, the control unit being configured to disable a shredding function of the tree processing implement when the sensor detects that the door is opened.

45. A tree processing vehicle as claimed in claim 44, the tree processing implement comprising a rotary shredder and a motor for imparting rotation to the rotary shredder, the control unit being configured to prevent the motor from imparting rotation to the rotary shredder when the sensor detects that the door is opened to disable the shredding function of the tree processing implement.

46. A tree processing vehicle as claimed in claim 45, wherein the motor is a hydraulic motor.

* * * * *